US009731818B2

(12) United States Patent
Dekel et al.

(10) Patent No.: US 9,731,818 B2
(45) Date of Patent: Aug. 15, 2017

(54) SYSTEM, A METHOD AND A COMPUTER PROGRAM PRODUCT FOR MANEUVERING OF AN AIR VEHICLE WITH TILTABLE PROPULSION UNIT

(71) Applicant: ISRAEL AEROSPACE INDUSTRIES LTD., Lod (IL)

(72) Inventors: Guy Dekel, Kazir (IL); Lior Zivan, Hadera (IL); Yoav Efraty, Tel Aviv (IL); Amit Wolff, Zur Moshe (IL); Avner Volovick, Petach Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 397 days.

(21) Appl. No.: 14/372,060

(22) PCT Filed: Jan. 10, 2013

(86) PCT No.: PCT/IL2013/050029
§ 371 (c)(1),
(2) Date: Jul. 14, 2014

(87) PCT Pub. No.: WO2013/105094
PCT Pub. Date: Jul. 18, 2013

(65) Prior Publication Data
US 2014/0339372 A1 Nov. 20, 2014

(30) Foreign Application Priority Data
Jan. 12, 2012 (IL) .......................................... 217501

(51) Int. Cl.
*B64C 27/26* (2006.01)
*B64C 29/00* (2006.01)
(Continued)

(52) U.S. Cl.
CPC .............. *B64C 27/26* (2013.01); *B64C 19/00* (2013.01); *B64C 29/00* (2013.01);
(Continued)

(58) Field of Classification Search
CPC ......... B64C 27/26; B64C 19/00; B64C 29/00; B64C 29/0033; B64C 39/024;
(Continued)

(56) References Cited

U.S. PATENT DOCUMENTS 3,467,344 A * 9/1969 Archibald ............ G05D 1/0204
244/184
3,627,238 A * 12/1971 Menn ................... G05D 1/0858
244/182
(Continued)

FOREIGN PATENT DOCUMENTS

WO 2008054234 A1 5/2008
WO 2010137016 A2 12/2010

*Primary Examiner* — Justin Rephann
(74) *Attorney, Agent, or Firm* — Browdy and Neimark, PLLC

(57) ABSTRACT

A control system configured to control a deceleration process of an air vehicle which comprises at least one tiltable propulsion unit, each of the at least one tiltable propulsion units is tiltable to provide a thrust whose direction is variable at least between a general vertical thrust vector direction and a general longitudinal thrust vector direction with respect to the air vehicle.

44 Claims, 8 Drawing Sheets

(51) Int. Cl.
*B64C 39/02* (2006.01)
*B64C 19/00* (2006.01)
*G05D 1/06* (2006.01)
*G05D 1/08* (2006.01)

(52) U.S. Cl.
CPC ........ *B64C 29/0033* (2013.01); *B64C 39/024* (2013.01); *G05D 1/0676* (2013.01); *G05D 1/0858* (2013.01); *B64C 2201/021* (2013.01); *B64C 2201/042* (2013.01); *B64C 2201/086* (2013.01); *B64C 2201/104* (2013.01); *B64C 2201/162* (2013.01); *B64C 2201/165* (2013.01); *B64C 2201/187* (2013.01)

(58) Field of Classification Search
CPC ........ B64C 2201/187; B64C 2201/165; B64C 2201/021; B64C 2201/042; B64C 2201/086; B64C 2201/104; B64C 2201/162; G05D 1/0858; G05D 1/0676
See application file for complete search history.

(56) References Cited

U.S. PATENT DOCUMENTS

| | | | |
|---|---|---|---|
| 3,916,688 A | 11/1975 | Dendy et al. | |
| 4,029,271 A | 6/1977 | Murphy et al. | |
| 4,740,899 A * | 4/1988 | McElreath | G05D 1/0858 244/17.13 |
| 6,464,166 B1 | 10/2002 | Yoeli | |
| 6,488,232 B2 | 12/2002 | Moshier | |
| 6,892,979 B2 | 5/2005 | Milde, Jr. | |
| 7,267,300 B2 | 9/2007 | Heath et al. | |
| 7,461,811 B2 | 12/2008 | Milde, Jr. | |
| 7,472,863 B2 | 1/2009 | Pak | |
| 9,187,174 B2 * | 11/2015 | Shaw | B64C 29/0033 |
| 2002/0113165 A1 | 8/2002 | Moshier | |
| 2003/0062442 A1 | 4/2003 | Milde, Jr. | |
| 2003/0080242 A1 | 5/2003 | Kawai | |
| 2003/0094537 A1 * | 5/2003 | Austen-Brown | B64C 27/28 244/7 R |
| 2004/0094662 A1 | 5/2004 | Sanders, Jr. et al. | |
| 2005/0125142 A1 * | 6/2005 | Yamane | G01C 11/00 701/510 |
| 2006/0032970 A1 | 2/2006 | Allen | |
| 2006/0226281 A1 | 10/2006 | Walton | |
| 2007/0057113 A1 | 3/2007 | Parks | |
| 2008/0054121 A1 | 3/2008 | Yoeli | |
| 2010/0137016 A1 | 6/2010 | Voyer | |
| 2011/0315809 A1 * | 12/2011 | Oliver | B64C 29/0033 244/12.4 |
| 2012/0091257 A1 * | 4/2012 | Wolff | B64C 29/0033 244/12.4 |
| 2015/0197335 A1 * | 7/2015 | Dekel | B64C 29/0033 701/5 |

\* cited by examiner

1500

SYSTEM, A METHOD AND A COMPUTER PROGRAM PRODUCT FOR MANEUVERING OF AN AIR VEHICLE WITH TILTABLE PROPULSION UNIT

RELATED APPLICATIONS

This application claims priority from IL patent application serial number 217501 filing date Jan. 12, 2012 and entitled "A System, a Method and a Computer Program Product for Maneuvering of an Air Vehicle" which is incorporated herein by reference in its entirety.

FIELD OF THE INVENTION

This invention relates to systems, methods and computer program products for maneuvering of an air vehicle.

BACKGROUND OF THE INVENTION

While the concept of implementing helicopter-like rotors on a winged aircraft can be traced back to as early as the 1930s, actual production of such aircraft took much longer to mature. The experimental Bell XV-3 aircraft, which was built in 1953, proved the fundamental soundness of the tiltrotor concept, and gathered data about technical improvements needed for future design.

A tiltrotor is an aircraft which utilizes one or more powered rotors (sometimes called proprotors) mounted on respective one or more tiltable structures. Those rotors may be used for both lift and propulsion, wherein different behavior is achieved when the rotors are tilted between a general vertical direction and a general horizontal direction, and in intermediate directions. Tilting of the rotors enables implementing, at certain times, vertical lift capability usually associated with helicopters, and at other times, the propeller propulsion usually associated with conventional fixed-wing aircraft. It is noted that while in tiltrotor aircraft usually only the rotor (and a structure onto which it is mounted) is usually tilted, tiltwing aircraft were also developed in which the entire wing—including the one or more rotors mounted thereon—is tilted.

Experiments in the field continued in the 1970's and 1980's with the development of the XV-15 twin-engine tiltrotor research aircraft, followed by the developing by Bell and Boeing Helicopters—starting in 1981—of the "V-22 Osprey" aircraft, which is a twin-turboshaft military tiltrotor aircraft for military needs. Another aircraft implementing tilt rotor technology is the commercial BA609 aircraft of Bell, teamed with AgustaWestland.

Tiltrotor unmanned aerial vehicles (UAVs) were also developed in the 1990's and 2000's, such as Bell's TR918 Eagle Eye, and IAI's Panther UAV.

By way of general background, the following publications disclose various aircraft configurations.

U.S. Pat. No. 7,267,300 discusses an aircraft comprising an airframe, a power plant mounted on the airframe, and at least two propellers rotatably mounted on the airframe and powered by the power plant for moving the aircraft in a generally forward direction during operation of the propellers. Also, the aircraft includes at least two counter-rotatable fan sets mounted on the airframe and powered by the power plant for providing upward lift to the aircraft during operation of the fan sets.

US 2006/0226281 discusses a vertical take-off and landing vehicle comprised of a fuselage having a front, a rear, and two lateral sides and a set of four thrusters set to the front, the left, the right, and the rear of said fuselage. The thrusters are comprised of a set of two counter rotating propellers both of which creates lift. The two counter rotating propellers cancel out the torque effect normally created by using only one propeller. The ducted fan units are movable between a first position in which they provide vertical lift and a second position in which they provide horizontal thrust using a set of servos and gears.

U.S. Pat. No. 7,472,863 discusses a vertical takeoff and landing (VTOL) aircraft design comprising one internal combustion engine able to spit shaft power to four fan units. The fan units further employ counter rotating fan blades for stability. Separate horizontal and vertical tilting mechanisms delivered to the fan units are additionally disclosed. A variation in design is further included wherein electric motors provide the necessary shaft power.

US 2004/094662 discusses an Unusual Flying Object said to have VTOL capabilities including forward flight with a Linear Induction Magnetic Bearings power drive.

U.S. Pat. No. 7,461,811 discusses a STOL or VTOL winged aircraft comprising a fuselage and a fixed wing attached to the fuselage and extending outward from the two lateral sides thereof, forming one wing component extending outward from one side of the fuselage and a second wing component extending outward from the opposite side of the fuselage. At least one "thruster" is disposed in each wing component to provide vertical lift to the aircraft when the aircraft is stationary or moving forward only slowly. The thruster includes a shaft mounted for rotation in the respective wing component and extending substantially parallel to the wing axis and a plurality of fan blades attached to the shaft for movement of air.

US 2003/062442 discusses a personal aircraft said to be capable of vertical take-off and landing and comprises a passenger compartment having a front, a rear and two sides, and a plurality of independently powered thrusters attached to the outer periphery of the compartment. At least three thrusters are disposed on each side of the compartment. The thrusters, which are preferably ducted fan units, are capable of providing a vertically upward force to the compartment.

U.S. Pat. No. 6,892,979 discusses a personal aircraft said to be capable of vertical take-off and landing which comprises: (a) a fuselage having a front end, a rear end and two lateral sides, the fuselage having a central longitudinal axis extending from the front end to the rear end, between the two lateral sides; (b) at least one, and preferably two or more, ducted fans, each arranged in the fuselage between the front end and the rear end and between the two lateral sides, for providing vertical lift; and (c) at least one substantially horizontal wing attached to each side of the fuselage and extending outward with respect to the central longitudinal axis.

U.S. Pat. No. 6,464,166 discusses a vehicle, particularly a VTOL air vehicle, including a duct carried by the vehicle frame with the longitudinal axis of the duct perpendicular to the longitudinal axis of the vehicle frame; a propeller rotatably mounted within the duct about the longitudinal axis of the duct to force an ambient fluid, e.g. air, therethrough from its inlet at the upper end of the duct through its exit at the lower end of the duct, and thereby to produce an upward lift force applied to the vehicle; and a plurality of parallel, spaced vanes pivotally mounted to and across the inlet end of the duct about pivotal axes perpendicular to the longitudinal axis of the duct and substantially parallel to the longitudinal axis of the vehicle frame. The vanes are selectively pivotal to produce a set horizontal force component to the lift force applied to the vehicle. Various vane arrangements are disclosed for producing side, roll, pitch and yaw movements of the vehicle.

US 2003/080242 discusses an aircraft that is mounted with turbofan engines with separate core engines having fan engines used commonly for cruising and lifting up, through enabling to direct the thrust from fan engines to all directions by supporting the fan engines composing the turbofan engines with separate core engines in biaxial support so that the fan engines are rotatable in the direction of pitching and rolling, the fan engines are mounted on both sides of each of front and rear wings.

US 2007/0057113 discusses a system and method provided for a STOL/VTOL aircraft that stores required take-off power in the form of primarily an electric fan engine, and secondarily in the form of an internal combustion engine.

US 2008/0054121 discusses a VTOL vehicle comprising a fuselage having forward and aft propulsion units, each propulsion unit comprising a propeller located within an open-ended duct wall wherein a forward facing portion of the duct wall of at least the forward propulsion unit is comprised of at least one curved forward barrier mounted for horizontal sliding movement to open the forward facing portion to thereby permit air to flow into the forward facing portion when the VTOL vehicle is in forward flight.

US 2002/113165 discusses a vertical takeoff aircraft that uses ducted fans for lift and propulsion. The fans are attached to an airframe and are disposed on opposite lateral sides of the aircraft. The thrust from the each of the fans may be deflected in different directions by using vanes with flaps disposed within the ducts of the fans, as well as by tilting the entire fan assemblies.

U.S. Pat. No. 6,488,232 discusses a single passenger aircraft configured to vertically take-off and land. An airframe is configured to support the passenger in an upright position during take-off and landing and during flight. The aircraft includes a pair of propulsion devices that are mounted on an airframe above the level of the pilot. A set of hand operated control devices are mechanically linked to the propulsion devices for varying the orientation of the propulsion devices during flight.

WO 2010/137016 discusses a system and method for providing propulsion and control to an air vehicle, and for operating the vehicle, in which at least three propulsion units provide vertical thrust for vectored thrust flight, and in which at least one or two of the propulsion units also provide thrust for vectored thrust cruising or aerodynamic flight by suitably tilting the respective propulsion units for changing the thrust vector thereof. At the same time, the three or more propulsion units are operated to generate controlling moments to the air vehicle about three orthogonal axes, pitch, roll and yaw, during vectored thrust flight (hover, cruising, etc.) or during aerodynamic flight for controlling the vehicle. The control moments are generated by selectively varying the thrust generated by each of the propulsion units independently of one another, and: by selectively vectoring the thrust of one propulsion unit with respect to each of two independent tilt axes independently of one another, or by selectively vectoring the thrust of each of two propulsion units with respect to a respective tilt axis, independently of one another.

WO 2008/054234 discusses a propulsion system of a vertical takeoff and landing aircraft or vehicle moving in any fluid or vacuum and more particularly to a vector control system of the vehicle propulsion thrust allowing an independent displacement with six degrees of freedom, three degrees of translation in relation to its centre of mass and three degrees of rotation in relation to its centre of mass. The aircraft displacement ability using the propulsion system of the present invention depends on two main thrusters or propellers which can be tilted around pitch axis by means of tilting mechanisms, used to perform a forward or backward movement, can be tilted around roll axis by means of tilting mechanisms, used to perform lateral movements to the right or to the left and to perform upward or downward movements, the main thrusters being further used to perform rotations around the vehicle yaw axis and around the roll axis. The locomotion function also uses one or two auxiliary thrusters or propellers mainly used to control the rotation around the pitch axis, these thrusters or propellers and being fixed at or near the longitudinal axis of the vehicle, with their thrust perpendicular or nearly perpendicular to the roll and pitch axis of the vehicle.

There is a need in the art for an air vehicle that can descend to a hover and for systems, methods and computer program products for maneuvering of air vehicles, and especially of tilt-rotor air vehicles.

SUMMARY OF THE INVENTION

In accordance with an aspect of the presently disclosed subject matter, there is provided a control system configured to control a deceleration process of an air vehicle which comprises at least one tiltable propulsion unit, each of the at least one tiltable propulsion units is tiltable to provide a thrust whose direction is variable at least between a general vertical thrust vector direction and a general longitudinal thrust vector direction with respect to the air vehicle, the control system comprising at least one input for receiving information indicative of monitored airspeed of the air vehicle and of monitored altitude of the air vehicle; and a control unit, configured to issue controlling commands to of aerodynamic systems of the air vehicle, the aerodynamic systems comprising the at least one tiltable propulsion unit; wherein the control unit is configured issue the controlling commands for: (a) controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and (b) controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle.

In accordance with an aspect of the presently disclosed subject matter, there is further provided an air vehicle system comprising: a wing; at least one tiltable propulsion unit wherein each of the at least one tiltable propulsion units is tiltable to provide a thrust whose direction is variable at least between a general vertical thrust vector direction and a general longitudinal thrust vector direction with respect to the air vehicle; and a control system, comprising: at least one input for receiving information indicative of monitored airspeed of the air vehicle and of monitored altitude of the air vehicle; and a control unit, configured to issue controlling commands to controllers of aerodynamic systems of the air vehicle, the aerodynamic systems comprising the at least one tiltable propulsion unit; wherein the control unit is configured issue the controlling commands for: (a) controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and (b) controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle.

In accordance with an embodiment of the presently disclosed subject matter, there is yet further provided a system, wherein the control unit is configured to control the descending course and the reducing of the groundspeed automatically.

In accordance with an embodiment of the presently disclosed subject matter, there is yet further provided a system, wherein the air vehicle includes a wing, wherein the control unit is configured to balance between contradictory aerodynamic effects resulting from the wing and from the at least one tiltable propulsion unit.

In accordance with an embodiment of the presently disclosed subject matter, there is yet further provided a system, wherein the control unit is configured to control the reducing of the groundspeed of the air vehicle during a substantially horizontal flight of the air vehicle.

In accordance with an embodiment of the presently disclosed subject matter, there is yet further provided a system, wherein the control unit is configured to control, during at least the second part of the descent, reduction of the groundspeed below a maximum permitted threshold speed before an end of the descent and before a beginning of the substantially horizontal flight of the air vehicle.

In accordance with an embodiment of the presently disclosed subject matter, there is yet further provided a system, wherein the control unit comprises an altitude control module configured to minimize a vertical deviation of the air vehicle from a set altitude when the control unit controls the reducing of the groundspeed, and to restrict the minimizing at least based on the restricting of the reduction of the thrust power based on the lower threshold.

In accordance with an embodiment of the presently disclosed subject matter, there is yet further provided a system, wherein the altitude control module is configured to further restrict the minimizing by restricting a rate of thrust power reduction based on a maximal permitted thrust power reduction rate.

In accordance with an embodiment of the presently disclosed subject matter, there is yet further provided a system, wherein the control unit comprises a speed control module that is configured to determine the set groundspeed in response to a distance of the air vehicle from a predetermined hover destination position.

In accordance with an embodiment of the presently disclosed subject matter, there is yet further provided a system, wherein the control unit further includes a monitor, configured to repeatedly check, starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position; wherein the control unit is configured to selectively instruct tilting of the at least one tiltable propulsion unit to provide thrust in the general longitudinal thrust vector direction if a result of the checking was negative, and to further control a directing of the air vehicle to a position and a state in which the flight parameters are within the envelope.

In accordance with an embodiment of the presently disclosed subject matter, there is yet further provided a system, wherein the control unit further comprises a tilting control module that is configured to determine timing for tilting of the at least one tiltable propulsion unit between the first and the second parts of the descent, for minimizing a duration between the tilting and the substantial hover.

In accordance with an embodiment of the presently disclosed subject matter, there is yet further provided a system, wherein the control unit is configured to restrict the reduction of the groundspeed for preventing a reduction of the airspeed below a predetermined threshold until reaching a vicinity of a predetermined hover destination position.

In accordance with an embodiment of the presently disclosed subject matter, there is yet further provided a system, wherein the control unit comprises a pitch control module, configured to keep a pitch of the air vehicle within a permitted pitch range when the control unit controls the reducing of the groundspeed, wherein the permitted pitch range is dynamically determined in response to the measured airspeed of the air vehicle.

In accordance with an embodiment of the presently disclosed subject matter, there is yet further provided a system, wherein the pitch control module is configured to prevent stalling of the air vehicle at least by keeping the pitch within the permitted pitch range.

In accordance with an embodiment of the presently disclosed subject matter, there is yet further provided a system, wherein the control unit is configured to: determine, before the second part of the descent, a permitted air vehicle descending angle for at least a part of the descending course based on atmospheric conditions, and control the descending course during at least a part of the first part of the descent based on the permitted air vehicle descending angle.

In accordance with an embodiment of the presently disclosed subject matter, there is yet further provided a system, wherein the control unit is configured to control a substantially vertical descent of the air vehicle, after the reducing of the groundspeed of the air vehicle substantially to hover, until a fulfillment of at least one ground detection condition.

In accordance with an embodiment of the presently disclosed subject matter, there is yet further provided a system, wherein the control unit comprises a landing altitude control module that is configured to control a reduction of an altitude of the air vehicle during at least a part of the vertical descent, and to control modification of thrust power of the at least one tiltable propulsion unit, when controlling the reduction of the altitude, for minimizing a deviation of the monitored altitude of the air vehicle from a monotonously decreasing set altitude that decreases below a local ground level more than five times a height of the air vehicle.

In accordance with an embodiment of the presently disclosed subject matter, there is yet further provided a system, wherein the control unit is configured to initiate the controlling of the substantially vertical descent of the air vehicle if predetermined time elapsed from the tilting of the at least one tiltable propulsion unit, regardless of sensors data.

In accordance with an embodiment of the presently disclosed subject matter, there is yet further provided a system, wherein the control unit is configured to issue the controlling commands to the controllers of the aerodynamic systems for controlling an operation of at least one aerodynamic system of the air vehicle selected from a group consisting of an aileron, an elevator, a rudder, a ruddervator, a flaperon, elevons, and a wing flap.

In accordance with an aspect of the presently disclosed subject matter, there is yet further provided a method for controlling a deceleration process of an air vehicle which comprises at least one tiltable propulsion unit, each of the at least one tiltable propulsion units is tiltable to provide a thrust whose direction is variable at least between a general vertical thrust vector direction and a general longitudinal thrust vector direction with respect to the air vehicle, the method comprising: during a descent of the air vehicle, controlling a descending course of the air vehicle based on at least monitored airspeed and monitored altitude of the air vehicle, the controlling comprising carrying out in the following order: in a first part of the descent, controlling an operation of the at least one tiltable propulsion units to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and controlling a reducing of a groundspeed of the air vehicle substantially to a hover, while the at least one tiltable propulsion unit provides thrust in the general vertical thrust vector direction, at least by: controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle.

In accordance with an embodiment of the presently disclosed subject matter, there is yet further provided a method, wherein the controlling of the descending course and the controlling of the reducing of the groundspeed comprises automated controlling by at least one processor of a control unit mounted on the air vehicle.

In accordance with an embodiment of the presently disclosed subject matter, there is yet further provided a method, wherein the controlling of the deceleration process comprises controlling the deceleration process of the air vehicle that includes a wing, and balancing between contradictory aerodynamic effects resulting from the wing and from the at least one tiltable propulsion unit.

In accordance with an embodiment of the presently disclosed subject matter, there is yet further provided a method, wherein at least part of the controlling of the reducing of the groundspeed is carried out after the controlling of the descending course of the air vehicle, during a substantially horizontal flight of the air vehicle.

In accordance with an embodiment of the presently disclosed subject matter, there is yet further provided a method, further comprising controlling, during at least the second part of the descent, reduction of the groundspeed below a maximum permitted threshold speed before an end of the descent and before a beginning of the substantially horizontal flight of the air vehicle.

In accordance with an embodiment of the presently disclosed subject matter, there is yet further provided a method, further comprising minimizing a vertical deviation of the air vehicle from a set altitude concurrently with at least a part of the controlling of the reducing of the groundspeed, wherein the minimizing is restricted at least by the restricting of the reduction of the thrust power based on the lower threshold.

In accordance with an embodiment of the presently disclosed subject matter, there is yet further provided a method, wherein the minimizing is further restricted by restricting a rate of thrust power reduction based on a maximal permitted thrust power reduction rate.

In accordance with an embodiment of the presently disclosed subject matter, there is yet further provided a method, further comprising determining the set groundspeed in response to a distance of the air vehicle from a predetermined hover destination position.

In accordance with an embodiment of the presently disclosed subject matter, there is yet further provided a method, further comprising: repeatedly checking, starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position; and selectively instructing tilting of the at least one tiltable propulsion unit to provide thrust in the general longitudinal thrust vector direction if a result of the checking was negative, and controlling a directing of the air vehicle to a position and a state in which the flight parameters are within the envelope, and reinitiating the method starting again with the controlling during the first part of the descent.

In accordance with an embodiment of the presently disclosed subject matter, there is yet further provided a method, further comprising determining timing for tilting of the at least one tiltable propulsion unit between the first and the second parts of the descent for minimizing a duration between the tilting and the substantial hover.

In accordance with an embodiment of the presently disclosed subject matter, there is yet further provided a method, wherein the controlling of the reducing of the groundspeed comprises restricting the reduction of the groundspeed for preventing a reduction of the airspeed below a predetermined threshold until reaching a vicinity of a predetermined hover destination position.

In accordance with an embodiment of the presently disclosed subject matter, there is yet further provided a method, further comprising keeping a pitch of the air vehicle within a permitted pitch range concurrently with at least a part of the controlling of the reducing of the groundspeed, wherein the permitted pitch range is dynamically determined in response to the measured airspeed of the air vehicle.

In accordance with an embodiment of the presently disclosed subject matter, there is yet further provided a method, wherein the keeping of the pitch within the permitted pitch range prevents stalling of the air vehicle.

In accordance with an embodiment of the presently disclosed subject matter, there is yet further provided a method, wherein the controlling in the second part of the descent is preceded by determining a permitted air vehicle descending angle for at least a part of the descending course based on atmospheric conditions, wherein the controlling of the descending course during at least a part of the first part of the descent is based on the permitted air vehicle descending angle.

In accordance with an embodiment of the presently disclosed subject matter, there is yet further provided a method, further comprising controlling a substantially vertical descent of the air vehicle, after the reducing of the groundspeed of the air vehicle substantially to hover, until a fulfillment of at least one ground detection condition.

In accordance with an embodiment of the presently disclosed subject matter, there is yet further provided a method, comprising controlling a reduction of an altitude of the air vehicle during at least a part of the vertical descent, wherein the controlling of the reduction of the altitude comprises controlling modification of thrust power of the at least one tiltable propulsion unit for minimizing a deviation of the monitored altitude of the air vehicle from a monotonously decreasing set altitude that decreases below a local ground level more than five times a height of the air vehicle.

In accordance with an embodiment of the presently disclosed subject matter, there is yet further provided a method, comprising initiating the controlling of the substantially vertical descent of the air vehicle if predetermined time elapsed from the tilting of the at least one tiltable propulsion unit, regardless of sensors data.

In accordance with an embodiment of the presently disclosed subject matter, there is yet further provided a method, wherein at least the controlling of the descending course comprises controlling an operation of at least one aerodynamic part of the air vehicle selected from a group consisting of an aileron, an elevator, a rudder, a ruddervator, a flaperon, elevons, and a wing flap.

In accordance with an aspect of the presently disclosed subject matter, there is yet further provided a program storage device readable by machine, tangibly embodying a computer readable code portion executable by the machine for controlling a deceleration process of an air vehicle which comprises at least one tiltable propulsion unit, each of the at least one tiltable propulsion units is tiltable to provide a thrust whose direction is variable at least between a general vertical thrust vector direction and a general longitudinal thrust vector direction with respect to the air vehicle, the computer readable code portion comprising instructions for: during a descent of the air vehicle, controlling a descending course of the air vehicle based on at least monitored airspeed and monitored altitude of the air vehicle, the controlling comprising carrying out in the following order: in a first part of the descent, controlling an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and controlling a reducing of a groundspeed of the air vehicle substantially to a hover, while the at least one tiltable propulsion unit provides thrust in the general vertical thrust vector direction, at least by: controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle.

BRIEF DESCRIPTION OF THE DRAWINGS

In order to understand the invention and to see how it may be carried out in practice, embodiments will now be described, by way of non-limiting example only, with reference to the accompanying drawings, in which.

Figure 1A:
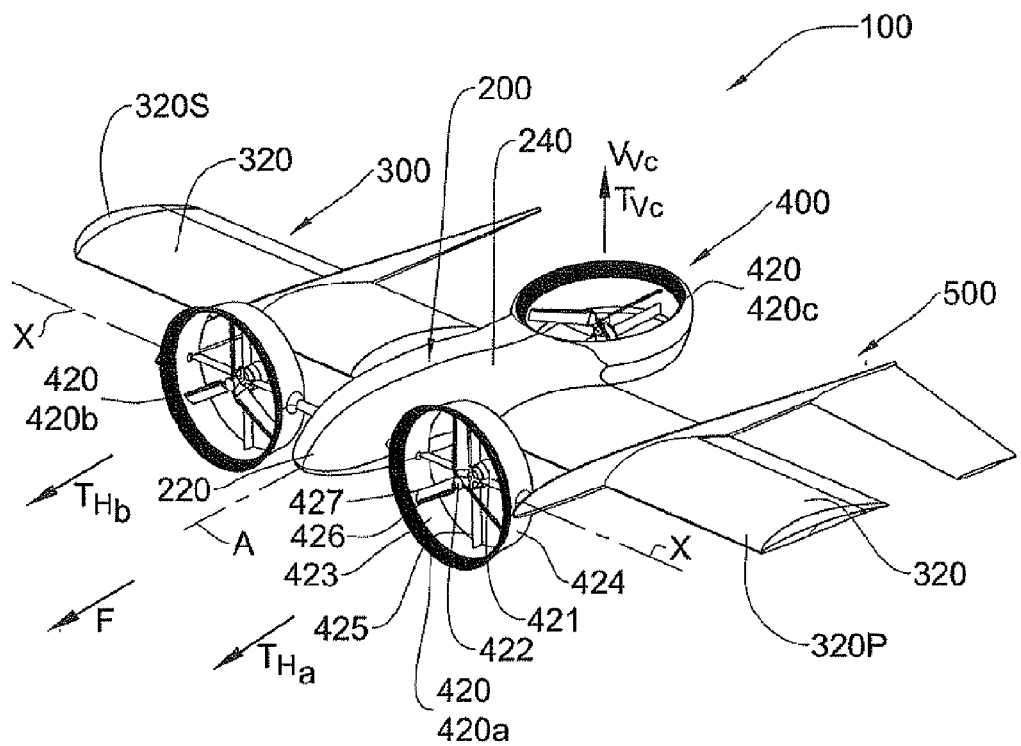
FIGS. 1A and 2A are front/top/side isometric views of a first embodiment and a second embodiment, respectively, of an air vehicle for which the invention may be implemented when its tiltable propulsion units are directed in a general longitudinal thrust position, in a first flight mode.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as processing, calculating, determining, generating, setting, configuring, selecting, or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter one or more stages illustrated in the figures may be executed in a different order and/or one or more groups of stages may be executed simultaneously and vice versa. The figures illustrate a general schematic of the system architecture in accordance with an embodiment of the presently disclosed subject matter. Each module in the figures can be made up of any combination of software, hardware and/or firmware that performs the functions as defined and explained herein. The modules in the figures may be centralized in one location or dispersed over more than one location.

The herein disclosed systems, methods, and computer program products may be implemented in a wide range of air vehicles having one or more tiltable propulsion units. Such air vehicles may be, by way of example, a tiltrotor air vehicle, a tiltwing air vehicle, a tiltjet air vehicle, an air vehicle propelled by a thrust vector or other type of tiltable jet engine, and so forth. It is noted that the group of air vehicles for which the invention may be implemented is not restricted to the above examples, and other types of air vehicles may also be implemented. It is especially noted that on top of the one or more tiltable propulsion units, the air vehicle may have one or more additional powerplants apart from the aforementioned tiltable propulsion units—such as a rotor for substantially vertical thrust; a propeller for substantially horizontal thrust, a jet engine, and so forth.

Each such tiltable propulsion unit may include, for example, any one of a tiltable ducted fan unit, a tiltable propeller unit, a tiltable turbojet unit, a tiltable turbofan unit, a tiltable propfan unit, and so on. Each such tiltable ducted fan unit may comprise at least one fan, and additionally or alternatively has an absence of vanes for controlling the respective said variable thrust vector. It is noted that the air vehicle may further include one or more non-tiltable propulsion units, fixedly (i.e., non-tiltably) mountable to the air vehicle to provide a thrust having a fixed thrust vector with respect thereto. Such a non-tiltable propulsion unit may include any one of a non-tiltable ducted fan unit, a non-tiltable propeller unit, a non-tiltable turbojet unit, a non-tiltable turbofan unit, a non-tiltable propfan unit. For example, such a non-tiltable ducted fan unit may include at least one fan and additionally or alternatively may have an absence of movable vanes for controlling the respective said vector.

FIGS. 1A, 1B, 2A, and 2B illustrate isometric views of air vehicle 100 in different flight modes that are different from each other in at least the tilt angle of the tiltable propulsion units 420. It is noted that while the below disclosed systems, methods, and computer program products may be implemented on an air vehicle such as the one disclosed in the WO 2010/137016 reference (that is incorporated herein in its entirety) and even exemplified in relation to such an air vehicle, the invention is in no way limited to such an air vehicle, and may be implemented on a wide range of air vehicles having at least one tiltable propulsion unit.

The aerodynamics of air vehicles with tiltable propulsion units is different from those of conventional fixed-wing airplanes and from those of helicopters, to give examples of two of the most widely implemented forms of aircraft.

In conventional fixed-wing airplanes, most of the lift is gained from flow of air around airfoils of the airplane, and especially its wings. Most of the thrust in airplanes is generated by engines usually operating in the generally longitudinal thrust vector direction aligned with the longitudinal axis of a fuselage of the airplane. While some airplanes implement a directed or vectored jet thrust for producing lift (e.g. the Harrier Jump Jet), and while some airplanes incorporate thrust vector control that enables a limited manipulation of a direction of their main jet (e.g. the TVC nozzles of the Sukhoi Su-30 MKI jet airplane can be deflected ±15 degrees in the vertical plane), the main source of lift—especially during flight of the airplane—is nevertheless the wing.

In helicopters, in comparison, most of the lift is supplied by one or more engine driven rotors, which also supply the thrust. While some lift may be gained from various surfaces of the helicopter, especially during flight (as opposed to hover), this lift is usually substantially smaller than the lift provided by the rotary wing. It should be noted that while some thrust is provided by the tail rotor in many helicopter designs, this thrust does not contribute to propelling the helicopter but is rather used to counter torque generated by the main rotor in such designs.

In comparison to the aforementioned examples of other types of conventional aircraft, when one or more tiltable propulsion units 420 of the air vehicle 100 are directed in general vertical thrust vector direction (e.g. as exemplified in FIG. 1B), lift is generated both by the tiltable propulsion units 420 and by wing 320 (as long as air vehicle 100 is flying at non-zero airspeed). This combination of lift generated both by the wing 320 and by the tiltable propulsion units 420 also occurs to a lesser extent when the tiltable propulsion units 420 are tilted to a diagonal position intermediate between the general vertical thrust vector direction and the general longitudinal thrust vector direction.

It will therefore be appreciated by a person who is skilled in the art that flight schemes that were suitable for either solely fixed wing or solely rotary wing aircrafts are not suitable for an air vehicle 100 having a tiltable propulsion unit 420 when the latter is directed in the general vertical thrust vector direction or intermediate directions. Attempting to maneuver air vehicle 100 when in such a constellation in manners borrowed from either solely fixed wing or solely rotary wing aircrafts is therefore bound to failure.

Figure 1B:
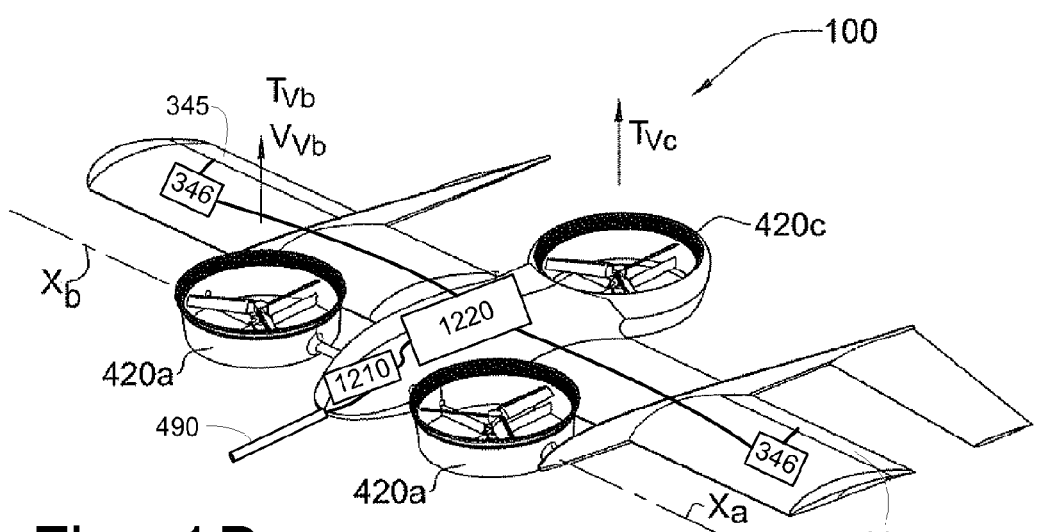
FIGS. 1B and 2B are front/top/side isometric views of the air vehicles of FIGS. 1A and 2A respectively, when the respective tiltable propulsion units are directed in a general vertical thrust position, in a second flight mode.
Figure 2A:
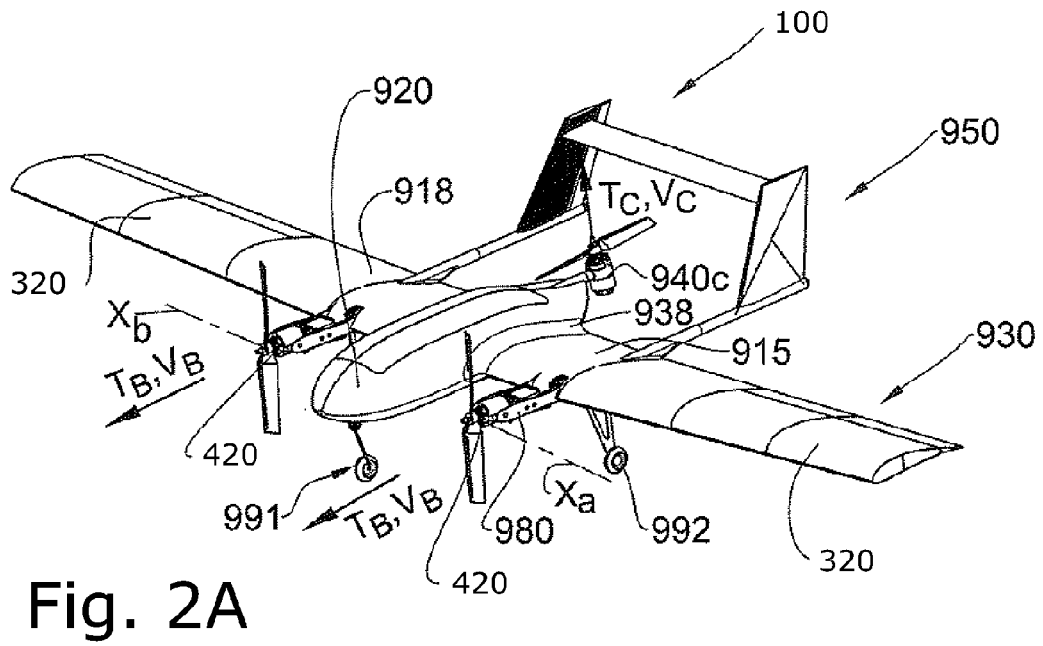
Figure 2B:
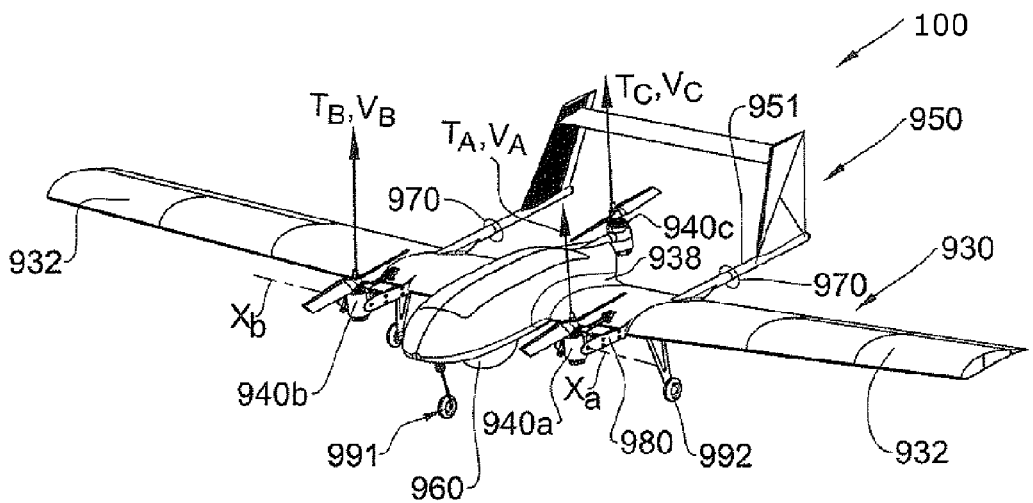

FIGS. 1A and 2A are front/top/side isometric views of two embodiments of air vehicle 100 for which the invention may be implemented, when the tiltable propulsion units 420 of each of the exemplary air vehicles 100 are directed in a general vertical thrust position. FIGS. 1B and 2B are front/top/side isometric views of the respective air vehicles 100 of FIGS. 1A and 2A, when the respective tiltable propulsion units 420 are directed in a general longitudinal thrust position.

It should be noted that some possible implementations of air vehicles 100 are exemplified in Patent Cooperation Treaty (PCT) application WO2010/137016 which is, as aforementioned, incorporated herein in its entirety. It is noted that numeral references used in the WO2010/137016 reference are used herein in the same meaning. It is noted that while that while air vehicle 100 is illustrated as a tilt-rotor aircraft, other types of aircraft that implement tiltable propulsion units—such as tilt-wing configurations, for example—may also be implemented as air vehicle 100.

It is further noted that while air vehicle 100 is illustrated as a subsonic UAV, in alternative variations of this embodiment the air vehicle may be different, e.g. manned and/or configured as a transonic and/or supersonic air vehicle.

According to an aspect of the invention there is provided a control system 1200, suitably mounted with respect to the air vehicle 100, and configured to control operation of air vehicle 100. The controlling of the operation of the air vehicle 100 by control system 1200 includes issuing of controlling commands to controllers of aerodynamic subsystems of the air vehicle. For example, a command to tilt a position of ailerons 345 may be issued to one or more aileron controllers 346 which hydraulically modify the position of the ailerons 345 with respect to the wing 320. Such controllers of aerodynamic subsystems of the air vehicle (e.g. controller 346) may be a part of control system 1200, though this is not necessarily so.

It is also noted that, in some implementations, more than one system may issue commands for a single controller of an aerodynamic subsystem. For example, the ailerons may be controlled independently by control system 1200 that is mounted on air vehicle 100, and by a remote system operated wirelessly by a ground operator. The control by different systems may be carried out sequentially (e.g. a human takeover of the controlling may prevent automated control), and may also be enabled and possibly carried out concurrently.

Control system 1200 may be the control system which controls air vehicle 100 during its entire sequence operation (e.g. take-off, flight, maneuvering, landing, shutting off), but this is not necessarily so. In any case, control system 1200 is at least configured to control a deceleration process of the air vehicle 100 (e.g. as disclosed below), and may optionally also be configured to control other operations thereof.

Control system 1200 may be fully automated and autonomous, but in some implementations it may also react to commands issued by another one or more systems and/or persons. For example, if over-ridden by a human issued command, control system 1200 may stop its autonomous control of the air vehicle 100, which is then controlled by another system or by the issuing person (either by mediation of control system 1200 or otherwise).

Control system 1200 includes one or more inputs 1210 for receiving information indicative of monitored airspeed of air vehicle 100, and of monitored altitude thereof. The monitored airspeed of air vehicle 100 may be detected by one or more airspeed detectors 490 (e.g. implemented as Pitot tubes), while the altitude of the air vehicle 100 may be determined by an altimeter (not illustrated, may be implemented, for example, as a pressure altimeter, a sonic altimeter, a radar altimeter, a Global Positioning System (GPS) based altimeter, and so forth). It is noted that inputs of the control system 1200 may also be used for receiving information indicative of additional parameters pertaining to flight and state of air vehicle 100.

Such parameters, on which the controlling by control system 1200 may be based, may include for example any one or more of the following parameters:
  a. Groundspeed;
  b. Pitch, yaw, and roll;
  c. Linear acceleration (along one or more axes);
  d. Angular acceleration;
  e. Time;
  f. Weight of the aircraft (of which center of mass may possibly be deducted, e.g. if deviation from take-off weight results from fuel consumption and/or dispatching of known weights);
  g. Energy level (e.g. residual battery charge level, fuel level);
  h. State of one or more aerodynamic subsystems (e.g. position of ailerons, etc.);
  i. Environmental atmospheric conditions;

As will be described in more detail herein, the control system 1200 may provide the desired control for the air vehicle 100 in accordance with one or more particular targets or a goal. For example, control system 1200 may control air vehicle 100 for landing it in a predetermined location, for bringing it to a hover at a determined location, etc. Clearly, other such goals may also be implemented by control system 1200—e.g. flying air vehicle 100 along a predetermined course, flying it to a predetermined location in an energetically efficient way, controlling its take-off, etc.

Reverting to the examples of landing air vehicle 100 or bringing it to a hover, some examples of additional parameters that may be used by control system 1200 (which may be defined by control system 1200, by another system, and/or by a person) are:
  a. Where should the air vehicle land or hover? (e.g. what is the hover destination position? What is the final landing destination?)
  b. At what height should the air vehicle hover?
  c. From which direction should the air vehicle arrive? (e.g. against the wind, at an azimuth of 271°, when a captured image by a camera mounted on the air vehicle matches one or more reference images, etc.)
  d. At what access angle should the air vehicle descend?
  e. What are the horizontal ranges allocated to some or all of the different sub-stages?
  f. What are the timing constraints for the landing?

Control system 1200 further includes at least one control unit 1220 that is configured to issue controlling commands to controllers (e.g. controller 346) of aerodynamic subsystems (e.g. aileron 345, other control surfaces, etc.) of air vehicle 100. The aerodynamic subsystems includes, among others, the at least one tiltable propulsion unit 420.

Control unit 1220 may be the control system which controls air vehicle 100 during its entire sequence operation (e.g. take-off, flight, maneuvering, landing, shutting off), but this is not necessarily so. Control unit 1220 is configured to issue commands at least when control system 1200 controls the deceleration process of the air vehicle 100 (and at least for this goal), and may also be configured to issue commands for controlling other operations thereof. Control unit 1220 may be fully automated and autonomous, but in some implementations it may also react to commands issued by another one or more systems and/or persons. For example, if over-ridden by a human issued command, control unit 1220 may stop issuing commands autonomously, and air vehicle 100 may then be controlled by another system or by the issuing person (either by mediation of control unit 1220 or otherwise).

Control unit 1220 is configured to issue the controlling commands at least for:

(a) controlling, during a descent of air vehicle 100, a descending course of air vehicle 100 based on at least monitored airspeed and monitored altitude of the air vehicle 100, at least by: (i) controlling in a first part of the descent, an operation of the at least one tiltable propulsion unit 420 to provide thrust in the general longitudinal thrust vector direction for propelling air vehicle 100; and (ii) following a tilting of the at least one tiltable propulsion unit 420, controlling in a second part of the descent an operation of the at least one tiltable propulsion unit 420 to provide thrust in the general vertical thrust vector direction for providing lift to air vehicle 100; and (b) controlling a reducing of the groundspeed of air vehicle 100 substantially to a hover, while the at least one tiltable propulsion unit 420 provides thrust in the general vertical thrust vector direction, at least by controlling thrust power of the at least one tiltable propulsion unit 420 for reducing a difference between measured groundspeed of the air vehicle 100 and set groundspeed, while restricting reduction of the thrust power based on a lower threshold 1720 (FIG. 5) that is determined in response to a measured airspeed of the air vehicle 100.

Such commands issued by control unit 1220 may be commands issued to controllers of aerodynamic subsystems of air vehicle 100, but other types of commands may also be issued. For example, control unit 1220 may also issue a command (for the same goal) to dedicated processing units, to databases (for retrieval of data and for storing it for later use), to sensors for requesting data, to communication systems for communicating with off-board systems, and so forth. Control unit 1220 may include one or more processors, and/or one or more dedicated processing modules—each of which may be implemented in hardware, software, firmware, or any combination thereof.

The controlling of air vehicle 100 by control system 1200 as discussed above involves balancing and compensating between many contradictory requirements. As will be discussed below, the aerodynamic regime of a tilt rotor air vehicle is unique in many ways. For example, the stalling behavior of such an air vehicle is substantially different from that of a conventional fixed-wing aircraft but also from that of a helicopter or other rotary wing aircraft. A more detailed discussion is provided below, with respect to control system 1200 and also with respect to methods 1500 and 1600.

While not necessarily so, control unit 1220 (and control system 1200 in general) may control the descending course of air vehicle 100 by carrying out method 1500. According to an embodiment of the invention, control unit 1220 may also be configured to implement method 1600. Therefore, a discussion of these two methods is presented below, and the discussion of control system 1200 is continued thereafter. However, implementation of methods 1500 and 1600 is not restricted to control systems such as control system 1200.

Figure 3A:
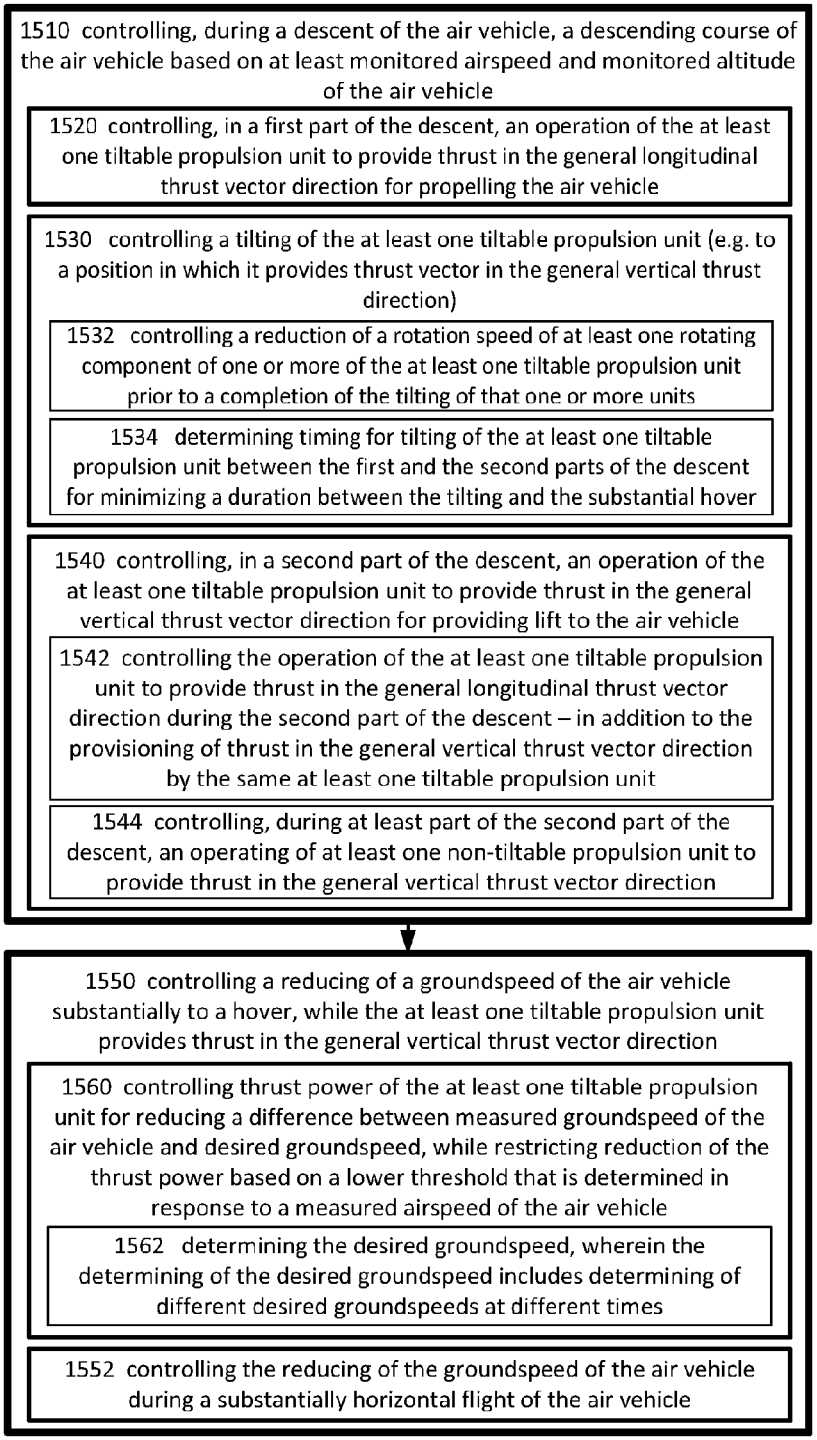
FIG. 3A is a flow chart of a method for controlling a deceleration process of an air vehicle which includes at least one tiltable propulsion unit, according to an embodiment of the invention.

FIG. 3A is a flow chart of method 1500, according to an embodiment of the invention. Method 1500 is a method for controlling a deceleration process of an air vehicle which includes at least one tiltable propulsion unit, each of the at least one tiltable propulsion units is tiltable to provide a thrust whose direction is variable at least between a general vertical thrust vector direction and a general longitudinal thrust vector direction with respect to the air vehicle. Referring to the examples set forth in the previous drawings, it is noted that method 1500 may be implemented to control a deceleration process of an air vehicle such as air vehicle 100. However, this is not necessarily so, and method 1500 may also be used to control deceleration processes of other types of air vehicles including one or more tiltable propulsion units 420.

Referring to the examples set forth in the drawings, it is noted that while not necessarily so, method 1500 may be carried out by a control system such as control system 1200. In various implementations, method 1500 may be carried out—wholly or partly, by an on-board system, by a remote system (e.g. ground system or airborne system), and/or by human intervention, as well as by any combination thereof.

It is noted that the following description pertaining to method 1500 (and the following descriptions pertaining to additional methods) is structured in an orderly way. That is, if stage A is carried out before stage B, alternative implementations and variations of stage A will be discussed before any substantial discussion of stage B. The reader may therefore benefit from reading the following description in view of the respective figures, in order to see what part each of the stages may take in the overall flow of method 1500, in at least one embodiment thereof.

During the description of method 1500, reference will be made to FIGS. 4A and 4B, which illustrate two possible example flight courses 1010 and 1020 of the air vehicle in which the air vehicle decelerates.

Ultimately, the deceleration process of method 1500 may be used to reduce the groundspeed of the air vehicle substantially to a hover and/or to provide a vertical landing. A destination location of the respective deceleration path may be determined in advance, but this is not necessarily so. For example, the deceleration process may be controlled to achieve hovering above a given location defined by geographical coordinates or for landing in another such location, it may be controlled for achieving landing or hovering at a predetermined height, within a given distance, or at other relative positioning, and it may also be controlled to land or hover within a given time frame. The destination may be updated from time to time (e.g. if required to hover or land above a target that is in motion when the destination is determined). A wide variety of additional exemplary scenarios will readily be apparent to the skillful practitioner.

It should be noted that in various implementations of method 1500, the decelerating process may address different needs, and may enable execution of method 1500 (and/or of specific stages thereof) within constraints that are stricter than previously possible. For example, while prior art tiltrotor aircrafts are known to have decelerated and even landed, doing so in a sufficiently quick a manner, within a sufficiently small distance, and/or losing substantial height in the process, may turn out to be impractical using prior art schemes. Some examples of scenarios are provided below.

It is noted that method 1500 includes several stages of controlling, as is disclosed below in detail. Such controlling may be implemented in various ways. Such controlling may be implemented by a pilot, by another person onboard, and by a remote human operator (e.g. for an unmanned tilt rotor air vehicle). However, method 1500 may also be implemented by one or more computerized systems (e.g. as exemplified in relation to system 1200). Such a system may be mounted onboard the air vehicle of method 1500, or externally, and multiple such systems may coordinate to implement method 1500 (wherein each stage of the method may be implemented by a single system or a combination of such computerized systems). Additionally, a combination of one or more human controllers and one or more computerized systems may also be implemented.

According to an embodiment of the invention, the controlling of the descending course and the controlling of the reducing of the groundspeed (both of which are disclosed in greater detail below) include automated controlling by at least one processor of a control unit mounted on the air vehicle. It is noted that such processors and/or other computerized systems may be a dedicated system (implemented in hardware, firmware, etc.), and may also be implemented in software run by a processor of another system mounted on the air vehicle.

It is also noted that different stages of method 1500 include controlling (e.g. controlling a reducing of groundspeed of the air vehicle in stage 1550). While not necessarily so, in each of the controlling stages method 1500 may possibly also include the carrying out of the controlled operation, even if not explicitly elaborated so. Continuing the same example, on top of the controlling of stage 1550, method 1500 may further include reducing the groundspeed of the air vehicle substantially to a hover.

Method 1500 starts with stage 1510 that is carried out during a descent of the air vehicle. Referring also to the examples set forth in FIG. 4A and FIG. 4B, stage 1510 may be carried out during part 1011 of course 1010 (or part 1021 of course 1020), but this is not necessarily so. It should be noted that the flight course of the air vehicle during the descent of stage 1510 is not necessarily a strictly monotonic descending course, and that while an altitude of the air vehicle at the end of the descent is substantially lower than its altitude at the beginning of the descent, the air vehicle may nevertheless experience some temporary ascents (e.g. due to unexpected winds or air conditions, due to moving of control surfaces of the air vehicle, and even as effects of actions taken as part of the controlling of stage 1510—e.g. in order to keep the air vehicle within an envelope that ultimately permits deceleration to substantial hover at a predetermined hover destination position). The descending course may include descent of the air vehicle in a substantial fraction thereof—e.g. for 80% of its duration, and possibly even more (e.g. 90%, 95%, etc).

Stage 1510 that is carried out, as aforementioned, during a descent of the air vehicle includes controlling a descending course of the air vehicle based on at least monitored airspeed and monitored altitude of the air vehicle. Referring to the examples set forth in FIGS. 4A and 4B, stage 1510 may be carried out by a control unit such as control unit 1220.

Controlling of the course of the air vehicle may be achieved at least by controlling an operation of one or more of the aerodynamic subsystems of the air vehicle. Such parts may include, by way of example, the at least one tiltable propulsion unit, at least one non-tiltable propulsion unit, a throttle, an engine, ailerons, elevators, rudder, ruddervator, flaperons, elevons, wing flaps, slats, spoilers, air brakes, variable-sweep wings, non-tiltable propulsion unit, blades of rotors, and so on. It is noted that different stages of method 1500 (e.g. the controlling of stage 1510, 1520, 1530, 1540, 1550, or of any combination thereof) may include controlling an operation of at least one aerodynamic subsystem of the air vehicle selected from a group consisting of an aileron, an elevator, a rudder, a ruddervator, a flaperon, elevons, and a wing flap.

The controlling of such aerodynamic subsystems (and/or other parts) may be achieved in various ways, such as by issuing instructions to such parts, or to components controlling such parts. In a few exemplary implementations, instructions may be implemented by modifying an electric current transmitted to servos controlling such parts, by instructing a hydraulic pump to modify a pressure in a pipe leading to such a part, and so forth. In other examples, the controlling may be achieved by physical means. For example, if method 1500 is wholly or partly carried out by a pilot (or other person onboard), that pilot may change a physical state of one or more component—e.g. push a throttle. It is noted that physical means for controlling the course may also be implemented by systems and not only by humans, as will be clear to a person who is of skill in the art.

It should be noted that method 1500 may include not only the controlling of the operation of one or more of the aerodynamic subsystems of the air vehicle or other components/systems thereof, but also the actual operation thereof. In an example, while the controlling may be carried out by one or more people, processors, controllers, or like systems (different implementations and combinations thereof are possible), the operating of the different parts/components/systems of the air vehicle may be carried out by other parts/components/systems mounted on the air vehicle.

Referring to the descending course of the air vehicle, it should be noted that the controlling of the course of the air vehicle in stage 1510 may include controlling temporal and/or spatial aspects of it. For example, the controlling may include controlling of some or all of the following parameters—the speed of the air vehicle (or components thereof such as groundspeed, airspeed, descending speed, and so forth), controlling its arriving to predetermined location at a certain timing, controlling its altitude, its horizontal positioning, its pitch, its turn, its yaw, its direction, and so on and so forth.

The controlling of the course may include controlling the course at least for keeping the air vehicle within an envelope that ultimately permits its deceleration to substantially a hover at a predetermined hover destination position, or which ultimately permits accomplishing another goal. It is noted that such an envelope may not be the largest envelope permitting such a deceleration (or reaching of such other goal), but rather an envelope defined in view of such a goal. Some or all of the parameters defining such an envelope may also be defined regardless of the final destination, e.g. resulting from aerodynamic considerations (for example prevention of reaching a stalling angle, keeping direction against the wind), from tactical requirements (e.g. reducing an exposure period above/below given height), for requirements of another system of the air vehicle or system carried by it (e.g. for preventing damage to a sensitive camera payload), and so forth.

While the term envelope is a term widely used in the art and as aforementioned may carry meaning as understood by one of ordinary skill in the art, it is noted that this term may be regarded as including at least one or more of the following sets of parameters: a set of performance limits (e.g. of the aircraft) that may not be safely exceeded, a set of operating parameters that exists within these limits, and a set of spatial and/or temporal parameters relating to course parameters.

Stage 1510 that is carried out, as aforementioned, during a descent of the air vehicle, includes controlling a descending course of the air vehicle based on at least monitored airspeed and monitored altitude of the air vehicle.

The controlling of the descending course of stage 1510 includes at least stage 1520 that is carried out in a first part of the descent (e.g. part 1012 of course 1010, and part 1022 of course 1020), and stage 1540 that is carried out in a second part of the descent (e.g. part 1013 of course 1010, and part 1023 of course 1020), wherein the second part of the course comes after the first part of the course. While the second part may be a direct continuation of the first part of the course (e.g. as illustrated in FIG. 4A), this is not necessarily so, and the two parts may be remote from each other—both geometrically and temporally (e.g. as exemplified in FIG. 4B). Regardless of whether the second part is a direct continuation of the first part of the course or not, stage 1510 includes carrying out stages 1520 and 1540 in that order.

Stage 1520, that is carried out in the first part of the descent, includes controlling an operation of the at least one tiltable propulsion unit to provide thrust in the general longitudinal thrust vector direction for propelling the air vehicle. Especially, the controlling of stage 1520 may include controlling the operation of the at least one tiltable propulsion unit to provide thrust when directed in the general longitudinal thrust position (e.g. similar to the positioning of the tiltable propulsion units 420 in FIG. 1A). It is noted that controlling an operation of other components of the air vehicle may also be carried out during the first part of the descent. During this stage, the general longitudinal thrust vector direction (and the longitudinal axis of the air vehicle) may be controllably inclined to the horizontal at a nose-up angle, for enabling a descent of the air vehicle.

Optionally, the controlling of stage 1520 may include controlling the operation of any of the one or more tiltable propulsion units mounted on the air vehicle to provide thrust in the general longitudinal thrust vector direction (or at least, of any of the one or more tiltable propulsion units mounted on the air vehicle that may be tilted to provide thrust in the general longitudinal thrust vector direction, if not all tiltable propulsion units may be tilted to such a position).

The controlling of stage 1520 may include controlling the operation of any active tiltable propulsion unit mounted on the air vehicle to provide thrust in the general longitudinal thrust vector direction (e.g. if one or more of the tiltable propulsion units may be selectively deactivated).

The controlling of stage 1520 may include controlling the at least one tiltable propulsion unit for controlling the descending course of the air vehicle based on at least monitored airspeed and monitored altitude of the air vehicle. It is noted that the controlling of the descending course during the first part of the descent may include controlling the descending course of the air vehicle at least by controlling an operation of additional components of the air vehicle. As aforementioned, controlling of the course of the air vehicle may be achieved also during the first part of the descent at least by controlling an operation of one or more of the aerodynamic subsystems of the air vehicle, e.g. as exemplified above. This controlling may include controlling various systems of the air vehicle, for keeping the air vehicle within an operational envelope whose parameters are controllably defined for enabling the descent and/or slowing down of the air vehicle.

It is noted that in some implementations, a primary way of controlling the descending course of the air vehicle (and especially its rate of descent) during the first part of the descent is by controlling the pitch and the speed of the air vehicle. The descending in such implementations may be primarily achieved at that stage of the descent by pitching a nose of the air vehicle down (e.g. below the horizon), so that propelling of the air vehicle in the general longitudinal thrust vector direction has a vertical component directed downwards. In such implementations, a direction in which the air vehicle progresses may primarily be affected by the pitch of the air vehicle at that time. It should be noted that this is not necessarily so, and other parameters may also significantly affect a direction of the air vehicle—e.g. if generally vertical non-tiltable propulsion units are activated during the descent.

In a few examples, controlling a pitch of the air vehicle during the first part of the descent may include controlling an operation of at least one elevator of the air vehicle (if implemented); controlling a roll of the air vehicle during the first part of the descent may include controlling an operation of at least one aileron of the air vehicle (if implemented) and possibly also of a rudder thereof (if implemented); controlling a yaw of the air vehicle during the first part of the descent may include controlling an operation of at least one rudder of the air vehicle (if implemented) and possibly also of at least one aileron thereof (if implemented). Controlling of aerodynamic components of the air vehicle for controlling the descent course thereof during at least the first stage naturally depends on the type, shape; amount, size, etc. of such aerodynamic components implemented in any given implementation of the invention, and therefore goes beyond the scope of this disclosure.

The controlling of the descending course may further include controlling parameters that are not directly related for the descending. Also, some parameters which at first glance may seem of little relevance to the descending (e.g. yaw), may also be controlled for effective control of the descending course. For example, controlling the yaw may be required for keeping the air vehicle at a desired angle with respect to the wind and/or for compensating for wind effects, while control of the roll may also compensate for wind conditions or other instabilities of the air vehicle.

Stage 1540, that is carried out in the second part of the descent, includes controlling an operation of the at least one tiltable propulsion unit to provide thrust in the general vertical thrust vector direction. The provisioning of thrust in the general vertical thrust vector direction may be controlled for providing lift to the air vehicle. Especially, the controlling of stage 1540 may include controlling the operation of the at least one tiltable propulsion unit to provide thrust when directed in the general vertical position (e.g. similar to the positioning of the tiltable propulsion units 420 in FIG. 1B). Referring to the examples set forth in the previous drawings, stage 1540 may be carried out by a control unit such as control unit 1220.

Conveniently, stage 1540 may be carried out following a tilting of the at least one tiltable propulsion unit to a position in which it provides thrust vector in the general vertical thrust direction. It should be noted that the general vertical thrust vector direction is not necessarily perpendicular to the longitudinal axis of the aircraft, but is rather generally directed along the gravity operation direction. For example, the air vehicle may be inclined with respect to the horizon (e.g. it is in a nose-up or nose-down position), while the at least one tiltable propulsion unit is directed substantially in the direction of gravitation.

Especially stage 1540 may be carried out following a tilting of the at least one tiltable propulsion unit to a position in which the at least one tiltable propulsion unit provides thrust vector whose component (projection) in the general vertical thrust direction is substantially larger than its component (projection) in the general longitudinal thrust vector direction (e.g. at least 2 times larger, at least 5 times larger, at least 20 times larger, and so on).

Stage 1540 may be carried out following a tilting to the general vertical thrust vector direction of any active tiltable propulsion unit that may possibly be tilted in that direction.

It is noted that in any of the above examples, stage 1540 may be preceded by controlling an operation of one or more of the at least one tiltable propulsion units of the air vehicle following an at least partial tilting of that tiltable propulsion unit to a position in which at least part of its thrust is provided in the general vertical thrust direction.

In the discussion of stage 1520, it is mentioned that the operation of the at least one tiltable propulsion unit is controlled to provide thrust in the general longitudinal thrust vector direction for propelling the air vehicle. It is noted that other propulsion units (especially non-tiltable ones) may also be used during that part of the course for providing thrust in the general longitudinal thrust vector direction, but this is not necessarily so. Especially, in some implementations, all the thrust provided to the air vehicle in the general longitudinal thrust vector direction during the first part of the descent is provided by the at least one tiltable propulsion unit.

It is noted that an angle of the at least one tiltable propulsion unit with respect to the air vehicle changes with speed in the first flight mode, e.g. by being lower than a fuselage main axis as the air vehicle goes faster (an angle "lower" than the fuselage main axis means that a symmetry axis of the propulsion unit is directed more towards the bottom of the air vehicle rather than towards its top). This may be implemented and controlled in order, for example, to maintain angle of attack). The controlling of the direction of the tiltable propulsion unit below the fuselage main axis may be limited, e.g. up to 10 degrees below the fuselage main axis.

Optionally, method 1500 may include stage 1530 that precedes stage 1540 and which includes controlling a tilting of the at least one tiltable propulsion unit, e.g. to a position in which it provides thrust vector in the general vertical thrust direction. For example, the controlling of stage 1530 may include controlling the tilting of the at least one tiltable propulsion unit to a position in which the at least one tiltable propulsion unit provides thrust vector whose component (projection) in the general vertical thrust direction is substantially larger than its component (projection) in the general longitudinal thrust vector direction (e.g. at least 2 times larger, at least 5 times larger, at least 20 times larger, and so on). Referring to the examples set forth in the previous drawings, stage 1530 may be carried out by a control unit such as control unit 1220.

It is noted that method 1500 may include a stage of tilting the at least one tiltable propulsion unit, e.g. to a position in which it provides thrust vector in the general vertical thrust direction.

In different implementations, the tilting may be carried out in different ways, and according to different schemes. It is noted that various such ways and schemes may be performed in a single system implementing method 1500, wherein in each case the actual scheme to be implemented may be selected, for example, according to environmental conditions, aerodynamic conditions, a state of the air vehicle, and so forth.

For example, the controlling of the tilting may include controlling a timing of the tilting (e.g. in respect to the fastest possible tilting time in a given system), a degree of the tilting, the number and order of tiltable propulsion units tilted—and to what degree, tilting different units concurrently, partly concurrently, or sequentially, an operation of a tiltable propulsion unit during its tilting (e.g. thrust provided by it), and so forth.

In an example, stage 1530 may include stage 1532 of controlling a reducing of a rotation speed of at least one rotating component of one or more of the at least one tiltable propulsion units (e.g. a fan, a rotor, and/or an engine thereof) prior to a completion of the tilting of that one or more units in stage 1530 (and possibly prior to a commencement of such tilting). The control of the reducing of the rotation speed in stage 1532 may include controlling a breaking of a rotating component of a respective tiltable propulsion unit.

In an example, when making the transition from a first flight mode (in which tiltable propulsion units of the air vehicle are directed to provide thrust in the general horizontal direction to a second flight mode in which the tiltable propulsion units are directed in the general vertical direction (e.g. when wishing to land or hover after being in forward flight), motor rotors of the respective at least one tiltable propulsion unit of the air vehicle may be subjected to a braking procedure. Following such tilting of the at least one tiltable propulsion unit (or after most of such tilting was carried out), the respective motors may be activated (e.g. immediately) and run up to the required speed to provide the required thrust in the general longitudinal thrust vector direction. In implementations of the invention in which such breaking and/or reduction is carried out, a forward momentum of the air vehicle prior to the transition should suffice to ensure that enough aerodynamic lift is generated (e.g. due to flowing of air around a wing of the air vehicle) for supporting the air vehicle during transition.

A feature of the procedure of braking and/or reduction of a thrust provided by one or more of the at least one tiltable propulsion units (if implemented) is that it minimizes or reduces to zero angular momentum (e.g. of rotors of the tiltable propulsion unit) on the at least one tiltable propulsion unit during this transition relative to what the such gyroscope-like effects would be if the rotating parts of the tiltable propulsion unit were still spinning at or close to their original angular velocity. Therefore, such a reduction or braking, if implemented, reduces the energy required for performing the transition as well as the elapsed time thereof, and also enables utilization of less massive and durable parts (e.g. in hinges and/or other components used for connecting the respective tiltable propulsion unit to a fuselage of the air vehicle) and/or of parts of lesser capabilities (e.g. drive mechanism for tilting the tiltable propulsion units can be less powerful, and typically smaller and lighter, than would otherwise be the case).

Air vehicle 100 may be configured for providing (e.g. by control unit 1220) a braking procedure to each tiltable propulsion unit 420, thereby enabling the motor 421 of each tiltable propulsion unit 420 to be stopped or at least considerably slowed down, in a relatively short time period, for example less than 1 second, thus destroying or significantly reducing the angular momentum in tiltable propulsion unit 420, e.g. of the motor rotor and fan 426.

According to an embodiment of the invention, at most the ensuing reduced angular momentum after the braking procedure is a very small proportion of the angular momentum of the respective rotating part of the tiltable propulsion unit during the first mode flight mode just preceding the braking procedure—such a proportion may be 50%, preferably 40%, more preferably 30%, more preferably 20%, more preferably 10%, more preferably 5%, more preferably 1%, more preferably less than 1%.

It is noted that such breaking or reduction of rotation speed is not compulsory, and possibly all rotating components of the at least one tiltable propulsion unit can each be rotated between the vertical thrust and horizontal thrust positions while continuously providing thrust, the respective thrust vector changing between zero and 90 degrees. Possibly, such a breaking or reduction procedure may be selectively implemented upon need.

Referring again to stage 1530 of controlling a tilting, it is noted that in different implementations, the at least one tiltable propulsion unit may be controllably tilted in stage 1530 to different extents. According to various implementations, the at least one tiltable propulsion unit can be rotated about any set tilt angle, ranging from (and including) zero to 90 degrees, or less than zero, or beyond 90 degrees, as desired, and remain at these respective tilt angles.

Method 1500 may further include optional stage 1534 of determining timing for tilting of the at least one tiltable propulsion unit between the first and the second parts of the descent for minimizing a duration between the tilting and the substantial hover.

While not necessarily so, operating the air vehicle (and especially any tiltable propulsion units thereof) may be substantially more energy consuming when in the second flight mode (in which the tiltable propulsion units are directed in the general vertical direction) than when in the first flight mode (in which tiltable propulsion units of the air vehicle are directed to provide thrust in the general horizontal direction). In an example implementation of a 70 Kg tiltrotor UAV, one minute of operation in the second flight mode may consume energy equivalent of some 10 to 20 minutes of flight in the first flight mode.

While not necessarily so, some performance parameters may also have lesser values in the second flight mode than their equivalents in the first flight mode. In an example, a maximum speed may be less, a maneuverability of the air vehicle may be less, and so forth.

Therefore in at least such scenarios, saving of energy (as well as other potential preferred conditions) may be achieved by minimizing the duration between the tilting and the substantial hover. It is however noted that the determining of the timing for the tilting may be based on other parameters apart from the duration between the tilting and the expected hover, which may restrict the minimizing of that duration. For example, desirable margins of error may be kept for safety considerations, maneuverability considerations in different parts of the expected course may also be taken into account, and so forth.

Stage 1534 may include determining timing for tilting of the at least one tiltable propulsion unit between the first and the second parts of the descent for minimizing a duration between the tilting of the at least one tiltable propulsion unit and the substantial hover. The determining of the timing in stage 1534 may be based on a range of possible aerodynamic states during the aforementioned duration between the tilting and the expected substantial hover.

Clearly, if stage 1534 is carried out, the controlling of the tilting in stage 1530 may be responsive to the determined timing. Method 1500 may include a stage of providing the timing determined in stage 1534 to at least one unit that participates in the controlling of the tiling of the at least one tiltable propulsion unit.

Returning to stage 1540 that is carried out in the second part of the descent, and which includes controlling an operation of the at least one tiltable propulsion unit to provide thrust in the general vertical thrust vector direction. It is noted that method 1500 may further include a stage (denoted 1542) of controlling the operation of the at least one tiltable propulsion unit to provide thrust in the general longitudinal thrust vector direction during the second part of the descent—in addition to the provisioning of thrust in the general vertical thrust vector direction by the same at least one tiltable propulsion unit. Stage 1542 may be carried out at least partly concurrently with the controlling of the operation of the at least one tiltable propulsion unit to provide thrust in the general vertical thrust vector direction.

Provisioning of thrust in the general longitudinal thrust vector direction may be carried out for providing thrust for propulsion. It is noted that controlling an operation of a propulsion unit to provide thrust in both the general vertical thrust vector direction and the general longitudinal thrust vector direction may be achieved in various ways. In but a few examples, a tiltable propulsion unit (e.g. a tiltable jet) may be tilted to an off-vertical angle in relation to a fuselage of the air vehicle, the vanes of a ducted fan may be moved, the pitch of rotor blades of a rotor may be changed cyclically for tilting a rotor disk in a particular direction (e.g. similarly to some helicopters), and so on.

Method 1500 may also include determining a trade-off between provisioning of thrust in the general vertical thrust vector direction and in the general longitudinal thrust vector direction, during the second part of the descent—when the at least one tiltable propulsion unit is directed in the general vertical direction (e.g. within 10° of it).

It is noted that in implementations in which more than one tiltable propulsion unit is implemented, the controlling of stage 1540 may include controlling of one, some, or all of the tiltable propulsion units of the air vehicle in the second part of the descent. Possibly, the controlling of stage 1540 includes controlling the operation of any of the one or more tiltable propulsion units mounted on the air vehicle to provide thrust in the general vertical thrust vector direction (or at least, of any of the one or more tiltable propulsion units mounted on the air vehicle that may be tilted to provide thrust in the general vertical thrust vector direction, if not all tiltable propulsion units may be tilted to such a position). The controlling of stage 1540 may include controlling the operation of any active tiltable propulsion unit mounted on the air vehicle to provide thrust in the general vertical thrust vector direction (e.g. if one or more of the tiltable propulsion units may be selectively deactivated).

It is noted that controlling an operation of other components of the air vehicle may also be carried out during the second part of the descent, e.g. for controlling some or all of the following parameters—the speed of the air vehicle (or components thereof such as groundspeed, airspeed, descending speed, and so forth), its altitude, its horizontal positioning, its pitch, its turn, its yaw, its direction, and so on.

The controlling of stage 1540 may include controlling the at least one tiltable propulsion unit for controlling the descending course of the air vehicle based on at least monitored airspeed and monitored altitude of the air vehicle. It is noted that the controlling of the descending course during the first part of the descent may include controlling the descending course of the air vehicle by controlling an operation of additional components of the air vehicle. As aforementioned, controlling of the course of the air vehicle may be achieved also during the second part of the descent at least by controlling an operation of one or more of the aerodynamic subsystems of the air vehicle, e.g. as exemplified above.

By way of example, controlling of pitch and roll may be carried out by controlling a changing of a direction of a thrust generating component of the respective tiltable propulsion unit (either by tilting the tiltable propulsion unit and/or by changing a direction of such component with respect to the tiltable propulsion unit itself), controlling of yaw may be carried out by controlling a tilting of a direction of thrust generated by two or more propulsion units in different directions (e.g. for providing opposing (or otherwise of different directions) horizontal thrust vectors to provide yawing moments and/or side slip movements), controlling of altitude may be carried out at least by controlling power provided to a thrust providing component of a respective tiltable propulsion unit or by modifying a configuration thereof (e.g. by changing pitch of its blades, if so implemented), controlling of groundspeed may include controlling of a direction of a thrust of one or more of the tiltable propulsion units, or a thrust of a non-tiltable propulsion units providing thrust having a component in the general horizontal vector direction with respect to a fuselage of the air vehicle, and so forth.

It is noted that method 1500 may further include stage 1544 carried out during at least part of the second part of the descent, that includes controlling an operating of at least one non-tiltable propulsion unit (if implemented) to provide thrust in the general vertical thrust vector direction. Referring to the examples set forth in the previous drawings, stage 1544 may be carried out by a control unit such as control unit 1220, and/or may include controlling the operating of a non-tiltable propulsion unit (such as non-tiltable ducted fan 420c of FIGS. 1A and 1B).

It should be noted that even while the at least one tiltable propulsion unit is directed to provide thrust in the general vertical thrust vector direction—and that possibly non-tiltable propulsion units (if implemented) of the air vehicle also provide thrust in the general vertical thrust vector direction, the air vehicle still includes components that serve for controlling of the course of aircraft when the at least one tiltable propulsion unit was directed to provide thrust in the general longitudinal thrust vector direction, and those components may also be used for controlling of the air vehicle (e.g. its pitch, yaw, roll, and speed) also at this stage. Some such components that may be implemented in various implementations are elevators, rudder, ailerons, etc.

Such components may be used for controlling the descending course of the air vehicle in stage 1540 (and possibly of a state of the air vehicle during that course) also during the second part of the descent. In but a few examples, controlling a pitch of the air vehicle during the second part of the descent may possibly include controlling an operation of at least one elevator of the air vehicle (if implemented); controlling a roll of the air vehicle during the second part of the descent may include controlling an operation of at least one aileron of the air vehicle (if implemented) and possibly also of a rudder thereof (if implemented); controlling a yaw of the air vehicle during the second part of the descent may include controlling an operation of at least one rudder of the air vehicle (if implemented) and possibly also of at least one aileron thereof (if implemented). Controlling of aerodynamic components of the air vehicle for controlling the descent course thereof during at least the second stage naturally depends on the type, shape, amount, size, etc. of such aerodynamic components implemented in any given implementation of the invention, and therefore goes beyond the scope of this disclosure.

Significantly, during the second part of the descent, the air vehicle still includes a wing which provides substantial lift when airspeed of the air vehicle is still relatively high (as it is during at least the greater part of the second part). Therefore, behavior (and consequentially control) of the air vehicle during the second part is different than that of other substantially vertical-thrust aircraft types (e.g. helicopter). For example, while in standard rotary wing aircraft reducing of thrust power below a given threshold would result in plain descent due to lack of sufficient lift to maintain altitude, in the air vehicle of method 1500 the wing would provide substantial lift and would make it difficult to reduce altitude quickly while the airspeed of the air vehicle is still high.

In a related aspect, in high enough airspeed of the air vehicle, substantial portion of the lift of the air vehicle is still provided by the wing. Therefore, pitching backwards (e.g. as is sometimes done in fixed wing airplanes as well as in prior art standard rotary wing aircraft types for slowing down) may result in crossing of the stall angle, sudden loss of lift from the wing, and stalling of the air vehicle.

It is noted that the stall speed of the air vehicle when in the second flight mode (i.e. when the at least one tiltable propulsion unit is directed in the substantial vertical direction) is substantially lower than the stall speed of that air vehicle when in the first flight mode (i.e. when the at least one tiltable propulsion unit is directed in the substantial horizontal direction), because of the additional lift provided by the generally vertically directed tiltable propulsion unit (i.e. due to that lift, less additional lift is required from the wing to keep a certain vertical velocity, which can be gained at a relatively lower speed). This may cause significant aerodynamic difficulties to recover from a spin or other induced aerodynamically-problematic states that may result from stalling, e.g. when compared to stalling when in the first flight mode of the air vehicle.

It is noted that in some implementations, a primary way of controlling the descending course of the air vehicle (and especially its rate of descent) during its descent is by controlling the vertical thrust provided by its propulsion units, and especially by the at least one tiltable propulsion unit. However, apart from the controllable lift directly controllable by the controlling of the at least one tiltable propulsion unit, substantial lift also generated by other components of the air vehicle, and primarily by its one or more wings. Since a primary goal of descending in such implementations may therefore require reduction of lift of the air vehicle gained by the one or more wings thereof, a speed of the air vehicle should be reduced in order to reduce such lift in at least some implementations.

It is noted that reduction of lift may also be achieved by pitching down (thus reducing an attack angle of each of the one or more wings). However, this may result in the speeding up of air vehicle due to gravity and possibly also to a horizontal thrust generated due to the tilting angle of the at least one tiltable propulsion unit. Descending usually requires losing energy (at least gravitational potential energy). Since in addition, stage 1550 of method 1500 (that is carried out at least partly after an initiation of the carrying out of stage 1540) includes controlling a reducing of a groundspeed of the air vehicle substantially to a hover, there is usually a further incentive to at least maintain (if not reduce) horizontal speed of the air vehicle during stage 1540. Other means that may be controllably utilized for reducing of speed are increasing lift (e.g. deploying flaps), increasing angle of attack (but not stalling), etc.).

Therefore, in some implementations, a primary way of controlling the descending course of the air vehicle (and especially its rate of descent) during its descent is by controlling a nose-up pitching of the air vehicle (when a nose of the air vehicle is pitched above horizontal level) and by controlling a speed of the air vehicle.

A combined controlling of a nose-up pitching of the air vehicle and of reducing horizontal forward thrust components (and even increasing horizontal backward thrust component) results in mutually assisting processes.

On the one hand, nose-up pitching the air vehicle enables reduction of the horizontal forward speed—by generating drag on the wing and by assisting in tilting the at least one tiltable propulsion unit backwards (thus possibly creating a backward horizontal thrust component).

On the other hand, slowing the air vehicle down enables nose-up pitching of the air vehicle (wherein such nose-up pitching would otherwise generate additional lift on the wing and possibly would have resulted in unset ascending of the air vehicle).

The thrust generated by the at least one tiltable propulsion unit, if indeed tilted backwards due to the pitching backwards, serves opposing factors in such a situation. On the one hand—a powerful thrust results in backward power that assists in slowing a horizontal speed of the air vehicle down (which as aforementioned may in turn assist in controlling a descent of the air vehicle). On the other hand, a powerful thrust by the generally vertically directed at least one tiltable propulsion unit results in additional lift that may disrupt an effort to lower an altitude of the air vehicle during its descent.

It would therefore become clear that controlling of the operation of the at least one tiltable propulsion unit during the descent is not an easy task—e.g. due to the opposing roles it serves and due to the hazardous results that may yield if controlled erroneously—even when assisted by controlling of other components of the air vehicle, e.g. as described above. Additional implementations and considerations of the controlling of the at least one tiltable propulsion unit and/or additional components of the air vehicle during the descent will be discussed in further detail below.

The controlling of the deceleration process may therefore include controlling the deceleration process of the air vehicle that includes a wing (referring to the examples set forth in the previous drawings, the wing may be wing 320), and balancing between contradictory aerodynamic effects resulting from the wing and from the at least one tiltable propulsion unit.

The descending course—or at least one or more portions thereof—may be characterized by an angle (or a slope) of the course with respect to the horizon. Such angle characterizes the vertical distance the air plane travels for each unit of horizontal distance. For example, if the air vehicle loses in a part of the course about 14 cm in altitude for every 100 cm horizontal distance traveled, then the corresponding slope is 14%, and the corresponding angle is about 8°.

An access angle (or a range of access angles) may be determined and used in later parts of the course traveled. The determining of such an access angle (or corresponding range of angles) may be based on various considerations—such as geometric considerations (e.g. distance from the destination location and current altitude), atmospheric conditions (e.g. wind), aerodynamic and/or energetic efficiency, operational considerations, capabilities of the air vehicle, and so forth.

Optionally, the controlling in the second part of the descent may be preceded by determining a permitted air vehicle descending angle (or a range thereof—e.g. by determining two threshold angles) for at least a part of the descending course based on atmospheric conditions (or other conditions e.g. as exemplified above), wherein the controlling of the descending course during at least a part of the first part of the descent is based on the permitted air vehicle descending angle. That is, in the discussed implementation the permitted air vehicle descending angle (or angles) is determined either during the first part of the descent (e.g. during part 1011 of the course) or even prior to the initiation of the descent (e.g. upon receiving a command to land or making such a decision, or even receiving that angle from a remote system).

A permitted air vehicle descending angle (or a range thereof)—which may be the angle determined for the first part of the descent but not necessarily so—may also be determined for at least a part of the second part of the descending course (e.g. based on atmospheric conditions or other conditions), wherein the controlling of the descending course during at least a part of the second part of the descent is based on that permitted air vehicle descending angle.

Figure 7:
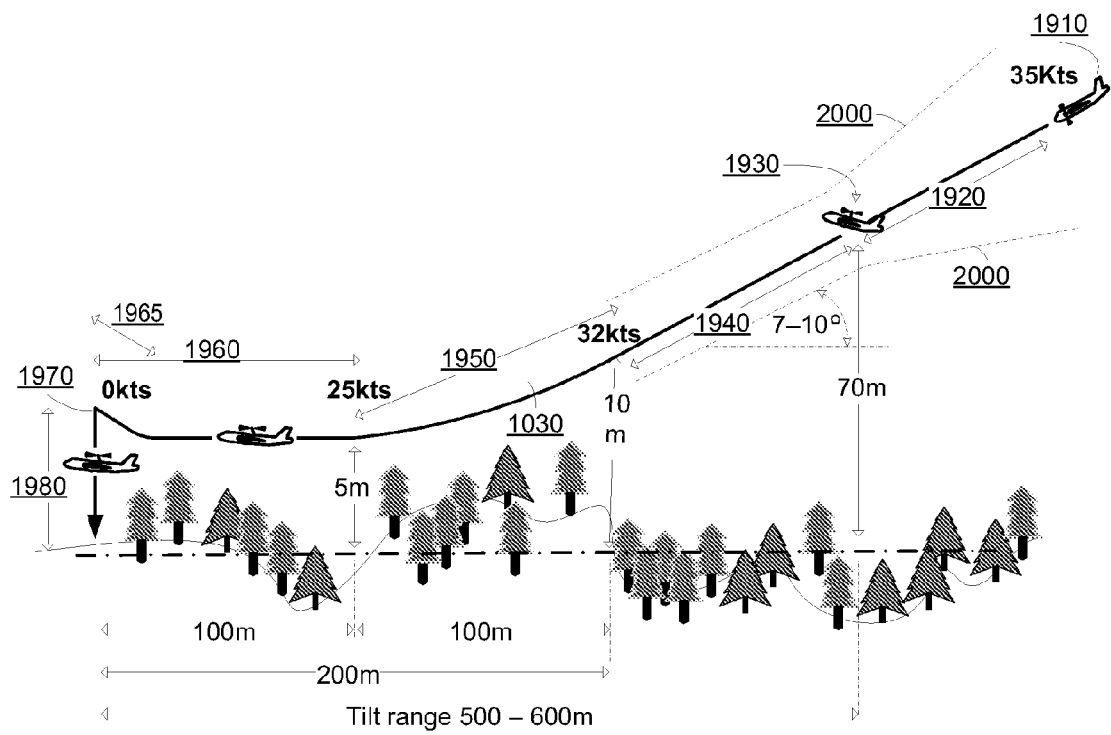
FIG. 7 illustrates a possible exemplary flight course of an air vehicle, during which it decelerates, according to an embodiment of the invention.

The controlling of either part of the descent course may include keeping the actual descent rate of the air vehicle within the limits based on the one or more permitted air vehicle descending angles. As can be seen in FIG. 7, for example, the actual descent angle of the course is kept during both the first part of the descent and part of its second part, but the permitted air vehicle descending angle ranges is modified between the first and the second parts. It is noted that the permitted air vehicle descending angle may be revisited and determined many times (and even substantially continuously) during the descending of the air vehicle.

Method 1500 further includes stage 1550 of controlling the reducing of a groundspeed of the air vehicle substantially to a hover, while the at least one tiltable propulsion unit provides thrust in the general vertical thrust vector direction. Referring to the examples set forth in the previous drawings, stage 1550 may be carried out by a control unit such as control unit 1220. Referring to the examples set forth in the previous drawings, stage 1550 may be carried out during part 1014 of course 1010 (or part 1024 of course 1020), but this is not necessarily so. It is noted that stage 1550 may at least partly overlap stage 1540 (and that controlling of reducing of groundspeed may also be carried out prior to stage 1540—e.g. when the at least one tiltable propulsion unit is directed in the substantially longitudinal direction). It is therefore to be understood that the part of the course in which reduction of the groundspeed is carried out (and controlled)—e.g. part 1024 of the course 1020—may at least partly overlap a part of the course in which descent of the air vehicle is carried out and controlled—e.g. part 1021 (and especially part 1023) of course 1020.

It should be noted that the groundspeed of the air vehicle during the reduction of the groundspeed of stage 1550 is not necessarily a strictly monotonic slowing down, and that while the groundspeed of the air vehicle at an end of the groundspeed reduction is substantially lower than its groundspeed at the beginning of the groundspeed reduction, the air vehicle may nevertheless experience some temporary acceleration (e.g. due to unexpected winds or air conditions, or moving of control surfaces of the air vehicle, and even as effects of actions taken as part of the controlling of stage 1550—e.g. in order to keep the air vehicle within an envelope that ultimately permits deceleration to hover at a predetermined hover destination position).

It should be noted that the flight course of the air vehicle during stage 1550 is not necessarily a strictly monotonic decelerating course. While an altitude of the air vehicle at an end of stage 1550 may be lower than its altitude at the beginning of that stage, this is not necessarily so, and in other scenarios the air vehicle may even ascend during at least some parts of stage 1550 (e.g. just before a final slowing down, for example in order to quickly convert the kinetic energy of the flight to gravitational potential energy, thus quickly diminishing the airspeed of the air vehicle, exemplified as 1016 in FIG. 4A). Such an ascent as in 1016 may be implemented due to a possible difficulty to diminish the final residual airspeed—e.g. the last 5 kts. An intended deliberate climbing may help in diminishing this airspeed, and may include, for example, a 5-10 meters ascent, and/or ascending in 2.5 degrees above the horizon. It is noted that during this deliberate climbing a deliberate stalling of the wings may be implemented.

Stage 1550 may conveniently include controlling reducing the groundspeed of the air vehicle based on at least monitored airspeed and monitored groundspeed of the air vehicle. Other monitored parameters may also serve as a basis to the controlling—e.g. monitored altitude of the air vehicle.

It is noted that while in a perfect theoretical hover the groundspeed of an aircraft is exactly zero, reaching that theoretical standard this is not practically achievable in practical systems, especially when subject to varying environmental conditions. This is all the more problematic in implementations in which the at least one tiltable propulsion unit, when directed in the general vertical direction, may generate gusty air in the vicinity of the air vehicle during an attempted hover of the latter, which acts against the fuselage and flight control surfaces.

Since in many cases a theoretical zero groundspeed hover is not practically achievable for any significant time in at least some implementations, it will be clear to a person who is skilled in the art that in the substantial hover state some groundspeed and some deviation from a set location are permitted. The sizes of such error margins are different in different implementations. For example, the air vehicle may be permitted to hover in deviation of up to 1 m from the set hover location, and in groundspeeds that do not exceed 2 m/sec, but other values are just as readily implementable. It is especially noted that the sizes of the error margins in the various possible implementations may be interrelated with the size of the air vehicle in such implementations, and with other characteristics thereof.

Controlling of the reduction of groundspeed of the air vehicle may be achieved at least by controlling an operation of one or more of the aerodynamic subsystems of the air vehicle. Such parts includes the at least one tiltable propulsion unit and may also include by way of example, as aforementioned, at least one non-tiltable propulsion unit, a throttle, an engine, ailerons, elevators, rudder, ruddervator, flaperons, elevons, wing flaps, slats, spoilers, air brakes, variable-sweep wings, non-tiltable propulsion unit, blades of rotors, and so on. The controlling of such aerodynamic subsystems (and/or other parts) may be achieved in various ways, such as those exemplified above, e.g. with relation to stage 1550. During reduction of the groundspeed, method 1500 may include controlling temporal and/or spatial aspects of the flight of the air vehicle. For example, the controlling may include controlling of some or all of the following parameters—the speed of the air vehicle (or components thereof such as groundspeed, airspeed, descending speed, and so forth), controlling its arriving to a predetermined location at a certain timing, controlling its altitude, its horizontal positioning, its pitch, its turn, its yaw, its direction, and so on and so forth.

According to an embodiment of the invention, the controlling of the reducing of the ground speed may include managing (or controlling) drag created by various components of the air vehicle. The managing of the drag may include controlling operation of ailerons, potentially implemented air brakes, and possibly also wheels. This management or control of drag may be implemented autonomously, continuously, and may include dynamic drag management.

While not necessarily so, the controlling of reduction of the groundspeed may include and/or be at least partly concurrently carried out with controlling a course of the air vehicle at least for keeping the air vehicle within an envelope that ultimately permits deceleration to hover at a predetermined hover destination position, or which ultimately permits reaching another goal. It is noted that such an envelope may not be the largest envelope permitting such a deceleration (or reaching of such other goal), but rather an envelope defined in view of such a goal. Some or all of the parameters defining such an envelope may also be defined regardless of the final destination, e.g. resulting from aerodynamic considerations (for example prevention of reaching a stalling angle, keeping direction against the wind), from tactical requirements (e.g. reducing an exposure period above/below given height), for requirements of another system of the air vehicle or system carried by it (e.g. for preventing damage to a sensitive camera payload), and so forth.

The controlling of the reducing of the groundspeed of the air vehicle substantially to a hover while the at least one tiltable propulsion unit provides thrust in the general vertical thrust vector direction of stage 1550 may possibly be implemented at least by carrying out stage 1560 that includes controlling thrust power of the at least one tiltable propulsion unit for reducing a difference between measured (or otherwise estimated) groundspeed of the air vehicle and set groundspeed, while restricting reduction of the thrust power based on a lower threshold that is determined in response to a measured airspeed of the air vehicle. Referring to the examples set forth in the previous drawings, stage 1560 may be carried out by a control unit such as control unit 1220.

It should be noted while the groundspeed is a monitored parameter whose reduction is controlled (e.g. in a controlled gradual process), the airspeed of the air vehicle cannot be ignored either, at least due to its direct impact on the lift generated on the wing portions. That is, while controlling components of the air vehicle for gradually reducing the groundspeed (e.g. in order to reach a final destination stationary with respect to the ground), the controlling is nevertheless carried out in response to the airspeed of the air vehicle, as the airspeed rather than the groundspeed is the speed that affects the aerodynamic behavior of the air vehicle.

Referring to the term airspeed that is used throughout this disclosure, it is noted that airspeed pertains to a speed of the air vehicle relative to the airmass in which it is flying. It is noted that in different implementations, and possibly also depending on context of the discussion, different conventions may be used for the airspeed, among which are:

Indicated airspeed, "IAS", which is a reading of an airspeed indicator (ASI) before any corrections are applied to it, (e.g. for instrument, position, and other errors);

Calibrated airspeed, "CAS", which is computed by applying corrections for the indicated airspeed, e.g. for instrument errors, position error (due to incorrect pressure at the static port) and installation errors;

True airspeed, "TAS", which is the real-world speed of the aircraft relative to the airmass in which it is flying, and which the calibrated airspeed is an attempted estimation of;

Equivalent airspeed, "EAS", which is the airspeed at sea level in the International Standard Atmosphere that would produce the same dynamic pressure as the true airspeed (TAS) at the altitude at which the air vehicle is flying, and which is the speed which would be shown by an airspeed indicator with zero error in low-speed flight;

Density airspeed, which is calibrated airspeed corrected for pressure altitude and true air temperature.

It is noted that as various measures of airspeed are interdependent, a process may be responsive to more than one of such measures. For example, since calibrated airspeed is computed from the indicated airspeed (which in turn depends on the true airspeed), a process that is based on the calibrated airspeed is also based—albeit possibly indirectly—on the indicated airspeed and/or on the true airspeed of the air vehicle.

For example, measurement and/or indication of airspeed may be accomplished by an airspeed indicator ("ASI") connected to a pitot-static system, both of which are installed on the air vehicle. The pitot-static system may include one or more pitot probes (or tubes) facing the on-coming air flow to measure pitot pressure, and one or more static ports to measure the static pressure in the air flow. These two pressures are compared by the ASI to give an IAS reading.

Referring to the term groundspeed that is used throughout this disclosure, it is noted that groundspeed pertains to the speed of an air vehicle relative to the ground above which the air vehicle is in flight, or to another reference coordinate system which is neither dependent on the air vehicle, nor on conditions in its environment (e.g. a coordination system utilized by a global navigation satellite system (GNSS) such as a Global Positioning System (GPS)). It is noted that in different implementations, and possibly also depending on context of the discussion, different measures may be used for the groundspeed, among which are:

Indicated groundspeed, which is a reading of a groundspeed indicating system;

Calibrated groundspeed, which is computed by applying corrections for the indicated groundspeed; and True groundspeed, which is the real-world speed of the air vehicle relative to the ground or the other aforementioned independent coordinate system, and which the calibrated groundspeed is an attempted estimation of.

Determination of the groundspeed may be implemented in various ways. For example, groundspeed may be estimated by an inertial navigation system, by an external positioning system (e.g. GNSS), by vector-subtracting a current wind speed vector from a vector of the true airspeed of the air vehicle, navigation using landmarks, radio aided position location, and so forth. Clearly, more than one way of estimating groundspeed of the air vehicle may be utilized in some implementations of the invention.

The controlling of the reducing of the groundspeed of the air vehicle substantially to a hover of stage 1550 is therefore based not only on the groundspeed of the air vehicle, but also on its airspeed. As will be clear to a person who is of skill in the art, the controlling of stage 1550 may also be based on different combinations of various one or more additional parameters. Some of such additional parameters include additional speed parameters (e.g. descending speed), time, altitude, horizontal positioning, pitch, turn, yaw, direction of the air vehicle (e.g. absolute, with regard to the destination location, and/or with regard to a direction of the wind), and so on and so forth.

It is also noted that the controlling of stage 1550 may include controlling of some or all of the following parameters—the speed of the air vehicle (or components thereof such as groundspeed, airspeed, descending speed, and so forth), controlling its arriving at a predetermined location at a certain timing, controlling its altitude, its horizontal positioning, its pitch, its turn, its yaw, its direction, and so on and so forth.

Referring to stage 1560 that includes controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle, it is noted that the set groundspeed changes throughout the course of the air vehicle during stage 1550.

Since an expected state of the air vehicle is substantial hover, and since stage 1560 starts before the air vehicle arrives at any predetermined hover destination position, clearly the set groundspeed changes over time from a forward flight groundspeed to substantially zero. However, it should be noted that the set groundspeed does not necessarily continuously and/or monotonically lessen with time, and in some instances it may even increase for some intermediate durations. For example, changing winds may result in increasing of the set groundspeed (e.g. if an opposing wind strengthens, it may be desirable to reach a vicinity of the destination hover location faster, because it is assessed that more drastic slowing down will be possible in a final stage of the control reduction of groundspeed).

It is noted that while the determined groundspeed may be determined directly, it may also be determined as a derivate of a previously determined entity, such as a planned course (which may also be modified from time to time).

Method 1500 may further include stage 1562 of determining the set groundspeed, wherein the determining of the set groundspeed includes determining different speeds at different times—either in a substantially continuous modification of the set groundspeed over time or in discrete changes.

The determining of the set groundspeed may be carried out in response to the distance of the air vehicle from a predetermined hover destination position. The actual determining may be carried out in different distances, but in other implementations a set groundspeed profile may be generated, indicating the set groundspeeds for different such distances. It is also noted that the set groundspeed may be determined as a range of permitted groundspeeds, which may be determined based on the distance from the predetermined hover destination position.

It is noted that while stage 1562 is illustrated as part of stage 1560, it may be carried out independently and also at a different timing, and in fact may be a part of an optional stage 1590 of method 1500, that includes determining values of one or more spatial parameters (e.g. location, velocity) for the air vehicle.

Stage 1590 may include determining values for course setting parameters for the air vehicle, but this is not necessarily so. Possibly, at least some of the parameters for which values are determined at stage 1590 may not be set parameters or targets whose achieving by actual performance of the air vehicle should be attempted or desired, but rather parameters that define ends of set or permitted ranges (e.g. of a determined envelope that ultimately permits deceleration to substantial hover at a predetermined hover destination position). For example, the determining of stage 1590 may include determining set pitch, but may also include (in addition to or alternatively) defining a range of permitted pitch angles, wherein deviation from this range results in immediate actions taken to counter this pitching deviation.

It is noted that stage 1590 may be carried out before and/or during any other stage of method 1500 for which such parameters may be used (e.g. values of parameters that pertain to the controlling of the operation of the at least one tiltable propulsion unit to provide thrust in the general vertical thrust vector direction for providing lift to the air vehicle in stage 1540 may be determined prior to the carrying out of stage 1540 and/or in parallel to it). It is noted that the determining of such values may be initiated in response to an initiation of any one or more stages of method 1500, but this is not necessarily so and such values may be also determined, for example, routinely during the flight of the air vehicle.

Reducing of the difference between the measured groundspeed and the set groundspeed may be achieved by either increasing or decreasing the airspeed of the air vehicle (and/or by modifying a direction thereof). While in many of the wind conditions that may occur in the duration in which stage 1550 is carried out, the airspeed of the air vehicle should be reduced, is it clear that in at least some conditions, increasing the airspeed may be set for reducing the difference between the measured groundspeed and the set one.

Decreasing of the airspeed when in the second flight mode has been exemplified above. Increasing of the airspeed when in the second flight mode—as well as control of such an increasing—may be carried out in several ways, possibly in different implementations. For example, the thrust of any of the at least one tiltable propulsion unit may be directed somewhat forwards (which may involve tilting of that tiltable propulsion unit, but not necessarily so); thrust may be generated by another non-tiltable propulsion unit capable of producing at least part of its thrust that is directed so a non-zero component of which is directed in the general longitudinal thrust vector direction; gravitational potential energy may be converted into kinetic energy (i.e. losing altitude may be used for increasing the airspeed of the air vehicle), and so forth.

Figure 5:
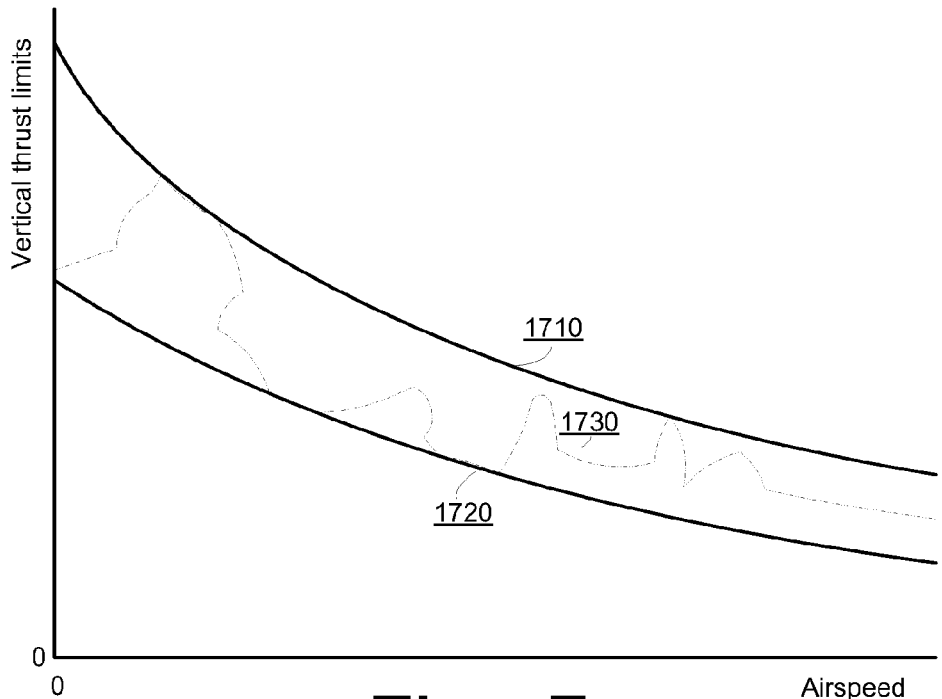
FIG. 5 is a graph which illustratively exemplifies restriction of thrust power based on the measured airspeed of the air vehicle, according to an embodiment of the invention.

FIG. 5 is a graph which illustratively exemplifies restriction of thrust power based on the measured airspeed of the air vehicle, according to an embodiment of the invention. The abscissa (the X axis) represents possible measured airspeeds of the air vehicle. The airspeed axis represented starts at zero measured groundspeed, but it is noted that its starting point may differ—and thresholds may also be given, for example, for negative airspeeds (i.e. when the airmass around the air vehicle progresses towards a front of the air vehicle with respect to the air vehicle, and not vice versa as is normally encountered in forward flight).

The ordinate (the Y axis) represents the thrust in the general vertical thrust vector direction. In the illustrated graph, the beginning of the ordinate is equivalent to zero thrust in the general vertical thrust vector direction, but this is not necessarily so. It is noted that neither units nor values are provided with respect to any of these axes, because the actual thresholds vary significantly depending on implementation. For example, the thrust provided in a given airspeed for a 70 Kg tiltrotor UAV is substantially lower than the thrust provided in the same airspeed for a 15 tons tiltrotor multi-mission aircraft. Likewise, the thrust values also greatly depend on other factors such as aerodynamic design, wing area, etc., and potentially also on operational circumstances (e.g. the thrust thresholds in a low height may be stricter than in high elevation).

Higher threshold 1710 represents the maximal permitted thrust in any possible measured airspeed, and lower threshold 1720 represents the minimal permitted threshold in any possible measured airspeed. Line 1730 represents a possible thrust during an exemplary descent course of the air vehicle. It is noted that different thrusts are shown in line 1730 for a single airspeed, as may occur in different situations—e.g. due to winds or due to the fact that the deceleration is not necessarily monotonic, and therefore the air vehicle may measure the same airspeed more than once.

It is noted that while the ordinate (the Y axis) represents the thrust in the general vertical thrust vector direction, the actual thresholds (both lower and higher) may not necessarily be a thrust threshold, but rather may be thresholds of one or more parameters associated with thrust (especially with thrust in the general vertical thrust vector direction).

For example, the threshold may be a threshold of the power provided (or sourced) by the at least one tiltable propulsion unit for providing thrust in the general vertical thrust vector direction, and/or may relate to a state of a throttle controlling that at least one tiltable propulsion unit. The threshold may also be a threshold that pertains to a measured value measured by a sensor (e.g. sensor measuring a rotating speed of a ducted fan or of the speed of downwards airflow created by it).

A controlled value (e.g. throttle state) or a measured value (e.g. measured rotation speed) may be easier to control and keep within an allowed limit than controlling the thrust directly. It is noted that controlling of the thrust power may be implemented by controlling such a controlled parameter (such as the power provided to the tiltable propulsion unit or the state of the throttle).

The controlling of the thrust of the at least one tiltable propulsion unit for reducing the difference between the measured and the set groundspeeds may therefore be restricted in light of the high threshold and/or of the low threshold—increasing of the thrust power may be restricted based on the higher threshold that is determined in response to the measured airspeed of the air vehicle (illustrated by line 1710) while reduction of the thrust power may be restricted based on the lower threshold that is determined in response to the measured airspeed (illustrated by line 1720).

Increasing of the thrust above the high threshold may result, for example, in an undesired ascent of the airplane or exceed the boundaries of an energy spending regime. On the other hand, decreasing of the thrust below the lower threshold may result, for example, in hitting the ground (if flying at a low altitude) and/or in stalling.

Decreasing of the thrust when hovering or when in low speed may result in sinking of the air vehicle and in an increase in the load on the wing. Exceeding below the allowed range of thrust may therefore result in sinking of the air vehicle, and in stalling of the wing. Notably, below a given velocity (which naturally depends on the specific implementation of the invention, e.g. 15 knots) the stalling of the wing has limited or no detrimental implications, as the greater part of lift is provided by the engines, and the affect of the wind is marginal.

If, however, the velocity of the air vehicle is higher than that given velocity but is nevertheless lower than the stalling velocity of the air vehicle, exceeding of the thrust below the allowed range would result a noticeable stalling, and may even result in flipping of the air vehicle. The allowed range, between thresholds 1710 and 1720, therefore defines a safe range in which the lift provided by the wing together with the engines is sufficiently positive.

Since the above exemplified possible results of decreasing the thrust below the lower threshold may be much more critical than the above exemplified possible results of increasing the thrust above the higher threshold, it is noted that exceeding the high threshold may sometimes be tolerated (e.g. in view of other aerodynamic considerations), while reducing thrust below the lower threshold may be more strictly avoided (and even entirely prohibited).

While not illustrated, it is noted that the rate of reducing the thrust may also be limited. For example, even if the high threshold is exceeded for whatever reason, the thrust according to such an implementation may not be sharply cut or reduced, but is rather reduced in a controlled manner wherein the reduction rate does not exceed a predetermined value. This may be implemented in order to keep drastic and too quick loss of thrust that may lead to instability, crashing, or other unset results. The increasing rate of the thrust may or may not be similarly limited.

As aforementioned, stage 1560, that is carried out during at least part of stage 1550 (and possibly also at other times in which parts of method 1500 are carried out) includes restricting reduction of the thrust power based on the lower threshold that is determined in response to a measured airspeed of the air vehicle.

While not necessarily during every moment of stage 1550, it is noted that possibly, during at least some parts of this stage a controlling of a reduction of the thrust power of the at least one tiltable propulsion unit will be carried out.

During the slowing down (the reduction of the groundspeed of the air vehicle), the one or more wings of the air vehicle (as well as potentially other aerodynamic components of which, such as ailerons, if implemented) still produce lift. Slowing down of fixed-wing airplanes usually involves reducing of thrust in the general longitudinal thrust vector direction. An additional and important technique used for slowing fixed-wing airplanes involves pitching a nose of such an airplane up, thus creating more drag. It is noteworthy that prior art rotary-wing aircraft (such as helicopters) may also tilt back the rotor for slowing down, which usually co-occurs with a pitching up of the aircraft.

Since when in the second flight mode, the air vehicle of method 1500 incorporates both a fixed wing and a rotary wing, the controlling of the reducing of the groundspeed (by way of reducing airspeed) may indeed include controlling a pitching up of the air vehicle (e.g. by controlling aerodynamic components of which, e.g. as discussed above, wherein it should however be noted that modifying a direction of the thrust provided by any of the at least one tiltable propulsion units does not necessarily involve tilting the entire vehicle, as in some implementations the at least one tiltable propulsion unit may be tilted backwards to achieve this effect).

Pitching the air vehicle up (raising its nose) results in increment in the lift generated due to the at least one fixed wing of the air vehicle, and therefore may require lift compensation that involves reducing the thrust in the general vertical thrust vector direction (e.g. generated by the at least one tiltable propulsion unit). Pitching the air vehicle backwards when the thrust by the at least one tiltable propulsion unit is directed in the general vertical thrust vector direction without such compensation may result in excess thrust being generated and ascent of the air vehicle.

Method 1500 may also include keeping a pitch of the air vehicle within a permitted pitch range concurrently with at least a part of the controlling of the reducing of the groundspeed, wherein the permitted pitch range is dynamically determined in response to the measured airspeed of the air vehicle. It is noted that maintaining the pitch within a permitted pitch range may also be carried out concurrently with at least part of the controlling of the descending course. The dynamically determined permitted pitch range may be determined based on other parameters except the airspeed of the air vehicle. For example—it may be further determined based on a part of the course (e.g. descending/non-descending), on an orientation of the at least one tiltable propulsion unit, on ambient aerodynamic conditions (e.g. wind, weather), on height, etc. Maintaining the pitch within the permitted pitch range may be used to prevent stalling of the air vehicle.

Figure 6:
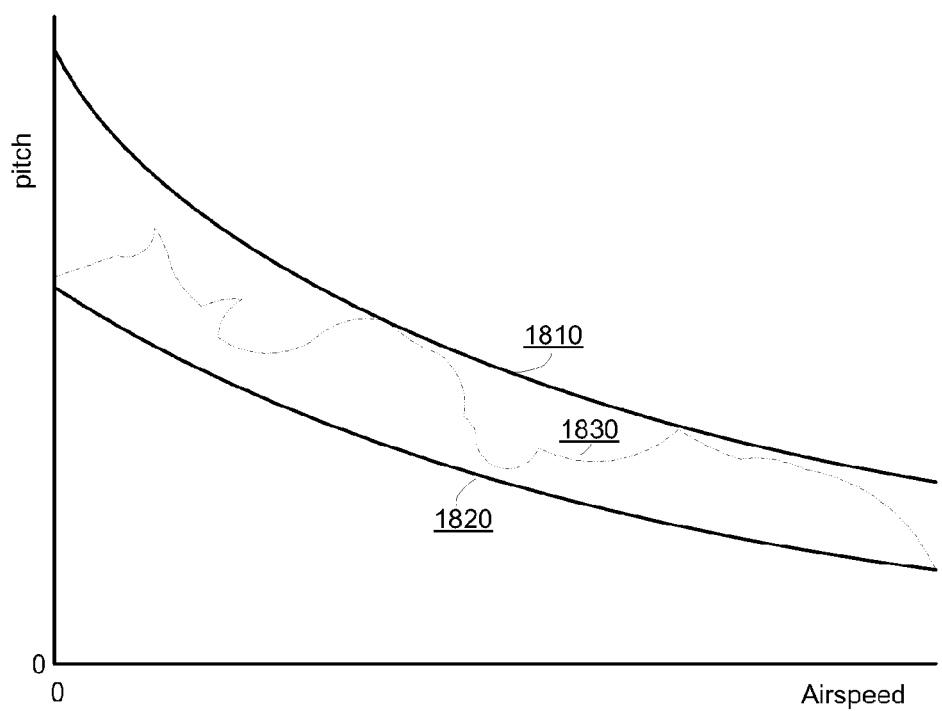
FIG. 6 is a graph which illustratively exemplifies restriction of pitch of the air vehicle based on the measured airspeed thereof, according to an embodiment of the invention.

FIG. 6 is a graph which illustratively exemplifies restriction of the pitch of the air vehicle based on the measured airspeed thereof, according to an embodiment of the invention. The abscissa (the X axis) represents possible measured airspeeds of the air vehicle. The airspeed axis represented starts at zero measured groundspeed, but it is noted that its starting point may differ—and thresholds may also be given, for example, for negative airspeeds (i.e. when the airmass around the air vehicle progresses towards a front of the air vehicle with respect to the air vehicle, and not vice versa as is normally encountered in forward flight).

The ordinate (the Y axis) represents pitch of the air vehicle with respect to the horizon. In the illustrated graph, the beginning of the ordinate is equivalent to zero pitch (may be defined, for example, that a line connecting the nose of the air vehicle and the rearmost part thereof is substantially horizontal), but this is not necessarily so.

It is noted that neither units nor values are provided with respect to any of these axes, because the actual thresholds vary significantly depending on implementation. For example, the pitch permitted in a given airspeed for a 70 Kg tiltrotor UAV may be substantially different than the pitch permitted in the same airspeed for a 15 ton tiltrotor multi-mission aircraft. Likewise, the permitted pitch values also greatly depend on other factors such as aerodynamic design, wing area, etc., and potentially also on operational circumstances (e.g. the pitch thresholds in a low height may be stricter than in high elevation).

The permitted pitch range at any airspeed may be defined by a higher pitch threshold and a lower pitch threshold. Higher pitch threshold 1810 represents the maximal permitted pitch in any possible measured airspeed, and lower pitch threshold 1820 represents the minimal permitted pitch in any possible measured airspeed. Line 1830 represents a possible pitch during an exemplary descent course of the air vehicle. It is noted that different pitches are shown in line 1830 for single airspeed, as may occur in different situations—e.g. due to winds or to the fact that the deceleration is not necessarily monotonic, and therefore the air vehicle may measure the same airspeed more than once.

It is noted that while the ordinate (the Y axis) represents the pitch in the general vertical pitch vector direction, the actual pitch thresholds (both lower and higher) may not necessarily be a pitch threshold, but rather may be thresholds of one or more parameters associated with pitch. For example, the pitch threshold may be a threshold of a pitch meter, an inclination meter threshold, and so forth. A controlled value or a measured value may be easier to control and keep within allowed limit than controlling the pitch directly. It is noted that the controlling of the pitch may be implemented by controlling one or more operations of one or more pitch influential components of the air vehicle—such as by controlling a inclination angle of the at least one tiltable propulsion unit, or modifying a state of a aerodynamic subsystems of the air vehicle, such as its elevators.

The controlling of the thrust of the at least one tiltable propulsion units for reducing the difference between the measured and the set groundspeeds—or controlling of other parameters—may therefore be restricted in light of the high pitch threshold and/or of the low pitch threshold, and vice versa.

Increasing of the pitch above the high pitch threshold may result, for example, in exceeding a stall angle, and decreasing of the pitch below the lower pitch threshold may result, for example, in reducing the ability of the air vehicle to lose speed.

It should be noted that at least part of the controlling of the reducing of the groundspeed may possibly be carried out after the controlling of the descending course of the air vehicle (i.e. while stage 1550 may at least partly coincide with stage 1540, according to such an implementation at least part of stage 1550 is carried out after stage 1540) during a substantially horizontal flight of the air vehicle (denoted stage 1552).

Clearly, other types of limitations and thresholds may also be implemented—either in addition or instead of the aforementioned thrust and/or pitch limits. For example, the angle of the air vehicle (e.g. its main axis connecting it frontmost and rearmost parts) with respect to wind, may be limited. In some implementations of the invention, when the air vehicle slows down, especially when in the second flight mode, it may have a tendency to rotate so it faces the wind. Limits may be used for limiting that angle, and this may assist in efficiently bringing the air vehicle to its destination.

Figure 4A:
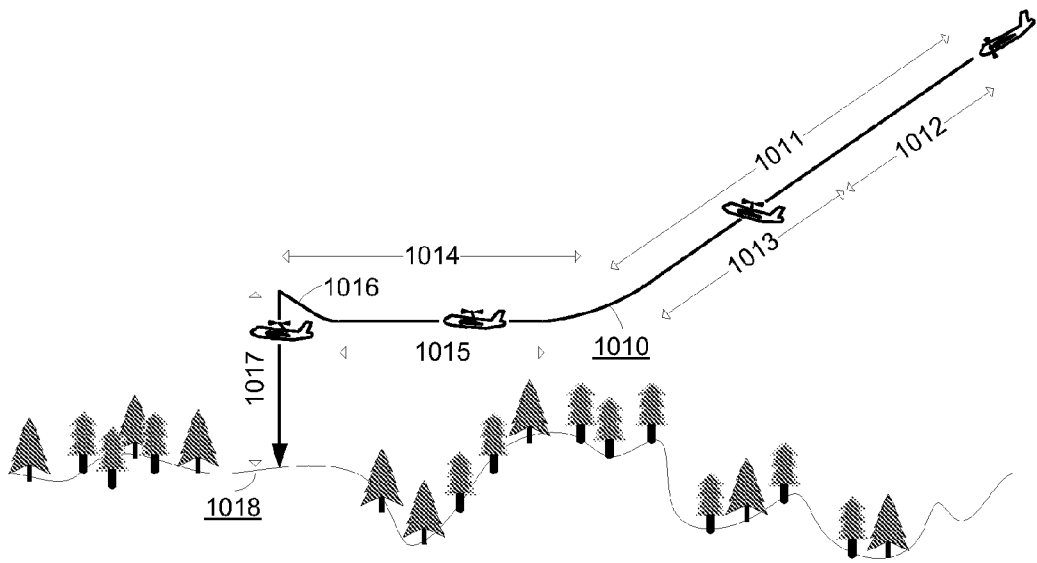
FIGS. 4A and 4B illustrate two possible flight courses of an air vehicle during which it decelerates, according to an embodiment of the invention.
Figure 4B:
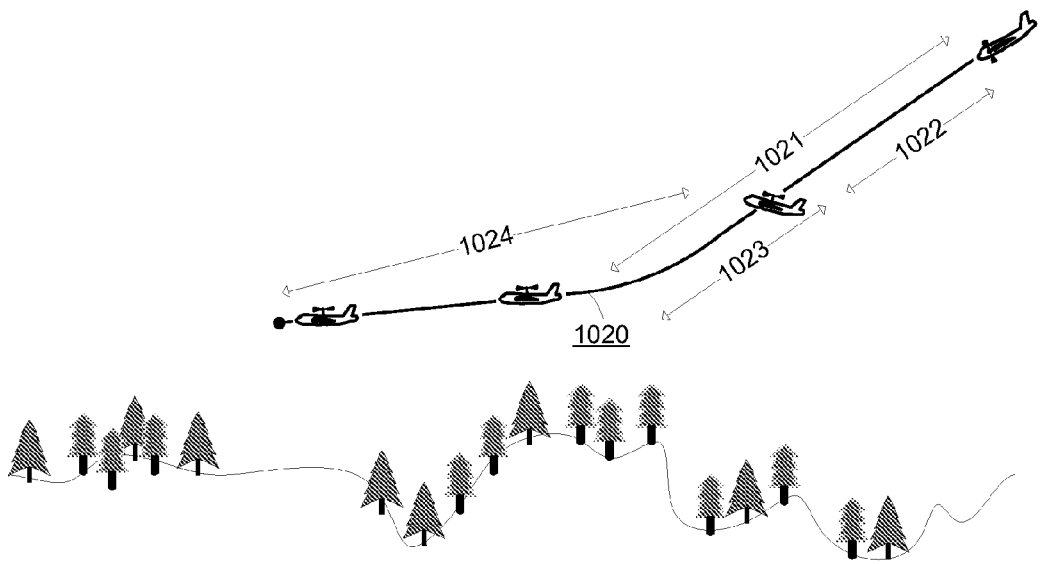

Referring to the example set forth in FIG. 4A, stage 1550 may be carried out at part 1015 of course 1010. It should be noted that a flight direction of the air vehicle during the substantially horizontal flight is not necessarily exactly horizontal, and that deviations from a perfect horizontal flight may occur. The substantially horizontal flight may be restricted to an altitude range that is fixed over time, and which thus may be considered as defining an imaginary horizontal corridor in which the air vehicle flies.

Method 1500 may therefore include controlling altitude modification of the air vehicle during the substantial horizontal flight for keeping the altitude of the air vehicle between a lower altitude threshold and a higher altitude threshold, wherein this controlling of altitude modification may be carried out concurrently with the controlling of stage 1550. While not necessarily so, the lower and the higher altitude threshold may be kept constant during the aforementioned controlling of the altitude modification, but this is not necessarily so. Alternatively, this may also be implemented, for example, by controlling altitude modification of the air vehicle for minimizing a vertical deviation of the air vehicle from a set altitude.

Such minimizing of maintaining altitude may be carried out during the substantial horizontal flight but also during other parts of the method, and may be carried out at least partly concurrently with the controlling of the reducing of the groundspeed.

In an example, the lower altitude threshold may be kept at 5 meters above local ground level (or an estimated/average ground level) and the higher altitude threshold may be kept at 10 meters above local ground level. Clearly, other values may be used, as would be clear to a person who is of skill in the art, e.g. depending on dimensions and aerodynamic capabilities of the implemented aircraft, on environmental conditions, on tactical/operational considerations, and so forth. Furthermore, the altitude thresholds are not necessarily defined in relation to a local ground height, and may be defined in relation to any other known altitude value, e.g. above sea level, above a destination hovering altitude, and so forth. Where applicable, e.g. in cases where thresholds are defined above local ground level (real/measured/estimated/average/etc.) and the ground level is not horizontal, the condition pertaining to the substantial horizontal flight may be replaced with a condition pertaining to flight at a substantially fixed height above local ground level.

It is noted that while controlling altitude modification in substantial horizontal flight, the controlling may be responsive to thresholds that are not fixed. For example, the thresholds may be somewhat modified depending on altitude modifications themselves (e.g. if the air vehicle rose during that controlling, whether intentionally or unintentionally, the threshold may be updated to reflect this change). The condition pertaining to the substantial horizontal condition may be replaced with a condition pertaining to flight with a relatively low rate of altitude change (e.g. course having an altitude change rate of less than 1%, of less than 2%, etc.).

Flying in a substantially horizontal flight (or other equivalents, e.g. such as those aforementioned) is not mandatory in every implementation of the invention, and a controlling system that at least partly controls the air vehicle may determine whether such a substantially horizontal course is set at the stage of groundspeed reduction (which may be the final stage prior to hovering). Some exemplary considerations for deciding upon such a substantially horizontal flight course are: aerodynamic considerations; payload considerations (e.g. when affectivity of the payload increases substantially at the designated hovering altitude), reducing exposure of the air vehicle to external threats, lowering below cloud level, and so on.

It is noted that in some situations, method 1500 may include restricting of different parameters relating to the state of the air vehicle. Some examples have been offered above. For example, as discussed above, the method may include controlling the altitude modification of the air vehicle for maintaining the altitude of the air vehicle between a lower altitude threshold and a higher altitude threshold (especially during the substantial horizontal flight, but possibly also before that, e.g. during the descent of the air vehicle). As further discussed above, method 1560 may also include controlling thrust power of the at least one tiltable propulsion unit while restricting reduction of the thrust power based on a lower threshold that is determined in response to a measured airspeed of the air vehicle. The controlling of altitude modification may be carried out concurrently with the controlling of the thrust.

In some scenarios, attempting to control more than single parameters may lead to situations in which the restricting of a first parameter conflicts with the restricting of another parameter. For example, keeping the air vehicle within a permitted altitude range may require at some point exceeding the threshold restrictions applied. For example, if a sudden gust of wind results in a sudden increase of lift from the wind, a fast reduction of the thrust in the general vertical thrust vector direction may be required in order to avoid rising above the higher altitude threshold. Therefore, at least one of the two respective thresholds must be exceeded, and in different implementations, different order rules may determine favoring one type of threshold over another.

Method 1500 may include minimizing a vertical deviation of the air vehicle from a set altitude (e.g. by the attempt to keep the altitude of the air vehicle between a lower altitude threshold and a higher altitude threshold), concurrently with at least a part of the controlling of the reducing of the groundspeed, wherein the minimizing is restricted at least by the restricting of the reduction of the thrust power based on the lower threshold.

That is, according to such an implementation, preventing of a reduction of the thrust power below the lower threshold is prioritized over the minimizing of the vertical deviation from the set altitude, and reducing the thrust in a way that would result in exceeding the lower threshold (e.g. by lowering a rotation rate of the blades of a tiltable rotor that is the tiltable propulsion unit below a lowest permitted rotation rate for the current measured airspeed) is prevented, even at the cost of failing to minimize the vertical deviation from the set altitude (e.g. even if it results in exceeding the concurrent higher altitude threshold).

The minimizing of the vertical deviation may be restricted (possibly further restricted, if implementing the immediately above disclosed restriction) by restricting a rate of thrust power reduction based on a maximal permitted thrust power reduction rate. That is, even if reduction of the thrust for minimizing the vertical deviation does not require thrust reduction that would result in exceeding of the lower threshold, it is nevertheless limited in such an implementation by the maximal permitted thrust power reduction rate.

The thrust power reduction rate may pertain directly to the thrust, and may also pertain to a reduction rate of a controlled value (e.g. throttle state) or a measured value (e.g. measured rotation speed). For example, even if the air vehicle is about to exceed the higher altitude threshold, it is determined that the thrust should be reduced, and the thrust-related lower threshold was not exceeded, the rate in which the thrust may be reduced in such an implementation is restricted by the maximal permitted thrust power reduction rate. The maximal permitted thrust power reduction rate may be defined in different ways, e.g. in a relative fashion (for example, a reduction of less than 1% of the current value per second) or in a fixed way (a reduction of less than 200 rpm per minute).

As aforementioned, at least part of the controlling of the reducing of the groundspeed may possibly be carried out after the controlling of the descending course of the air vehicle, during a substantially horizontal flight of the air vehicle (denoted stage 1552). It is nevertheless noted that at least part of the controlling of the reducing of the groundspeed may possibly be carried out concurrently to controlling of the descending course of the air vehicle, and prior to its substantially horizontal flight—if at all implemented. Referring to FIG. 4B, for example, part 1024 is the part of course 1020 in which the controlling of the reducing of the groundspeed substantially to a hover is carried out (while the at least one tiltable propulsion unit provides thrust in the general vertical thrust vector direction). It can be seen that part 1024 of the course partly overlaps with part 1023 of course 1020 in which descent of the air vehicle is carried out and controlled.

Moreover, possibly substantial reduction of the groundspeed may be carried out during the descent, and not only in the horizontal flight (if at all implemented). Such a reduction of groundspeed may be carried out when the at least one tiltable propulsion unit provides thrust in the general vertical thrust vector direction, but may also include substantial reduction of groundspeed prior to the tilting of the at least one tiltable propulsion unit, when the at least one tiltable propulsion unit provides thrust in the general longitudinal thrust vector direction.

Method 1500 may also include controlling, during at least the second part of the descent, reduction of the groundspeed to a fraction of the initial groundspeed at the beginning of the descending course (e.g. a fraction from a cruise speed of the air vehicle in which it cruised prior to starting to descent) before an end of the descent and before the beginning of the substantially horizontal flight of an air vehicle. In the course of FIG. 7, for example, if the cruising speed of the air vehicle is 35 knots (35 kts) and under the presumption of no significant wind, the initial groundspeed may be considered as 35 kts. At the end of the descent, prior to the horizontal flight, the groundspeed of the air vehicle may be for example 25 kts. In such an example, the reduction of the groundspeed is to about 70% of the initial groundspeed. The remaining 70% may be reduced during the substantially horizontal flight. In various implementations, the groundspeed may be reduced to other fractions of its initial value—e.g. about 50%, about 60%, about 70%, about 80% and about 90%.

The reduction of the groundspeed prior to substantially horizontal flight may also be governed otherwise. Method 1500 may include controlling, during at least the second part of the descent, reduction of the groundspeed below a maximum permitted threshold speed before the end of the descent and before the beginning of the substantially horizontal flight of the air vehicle.

The transition from descending course flight to horizontal flight may be carried out gradually, e.g. as a flare sub-stage (as indicated in FIG. 7). This stage may be the part of the descending course in which the larger part of the descent airspeed reducing is carried out (see, for example, the airspeed values indicated in FIG. 7).

It is noted that failure to sufficiently reduce the groundspeed (either prior to the end of the descent or at different stages throughout it or after it) may result in cancellation of the entire landing/slowing to a hover process, e.g. as the remaining distance until the destination may be insufficient to fully stop in such conditions.

It is noted that another scenario, in which the air vehicle slows down too quickly may also be an undesired one. If the air vehicle slows down at a too early stage (e.g. below 5 kts in the regime exemplified in FIG. 7), it may take a very long time to reach its destination, thus also causing waste of a great deal of energy on the way. All the more so, accelerating of the air vehicle once its velocity is so greatly reduced may be costly, inefficient, and time consuming.

The controlling of the reducing of the groundspeed may possibly include preventing a reduction of the airspeed below a predetermined threshold until reaching a vicinity of the predetermined hover destination position. This may be achieved, for example, at least by controlling a pitch angle of the air vehicle.

As was demonstrated above, in some scenarios, the air vehicle may reach a state in which it cannot stop in the predetermined hover destination position, or it cannot do so in reasonable time or using a reasonable amount of energy. Even if it may possibly do so, certain decision rules may be implemented to determine that the chances of completing such a task reasonably are below an accepted threshold.

Method 1500 may also include stage 1580 of repeatedly checking whether flight parameters are within an envelope permitting deceleration to hover at a predetermined hover destination position. Such repeated checking may be carried out at regular or irregular intervals, and each instance may be triggered by time or based on one or more measured parameters.

The repeatedly checking may commence, for example, during the first part of the descent and at least until reduction of the groundspeed to substantial hovering. By way of example, the repeated checking may be carried out at least until a first occurrence of an event selected from (a) receiving a negative result and (b) reduction of the groundspeed to substantial hovering.

If a negative result is received in the checking (i.e. if at least one of the flight parameters exceeds such an envelope), the method may include either an aborting of the landing/slowing down to a hover process, but may also include reiterating some parts of the method—e.g. by returning to the first flight mode, re-entering the envelope, and going through the sequence of stages (1510 to 1550) to a successful result.

It should be noted that even if the result of the checking is negative, the response is not necessarily ascending and reattempting to land (or otherwise to descend). For example, if, following the negative result, it is determined that the air vehicle is closer to landing than to flying (e.g. its airspeed is very low), then even if landing in the destination is not feasible, the method may nevertheless continue with landing the air vehicle in a near location. Other responses to a negative result of the checking may also be implemented, and various decision rules may be implemented to determine among a plurality of such possible response.

Method 1500 may include selectively instructing tilting of the at least one tiltable propulsion unit to provide thrust in the general longitudinal thrust vector direction if a result of the checking was negative, and controlling a directing of the air vehicle to a position and a state in which the flight parameters are within the envelope, and reinitiating the method, starting again with the controlling during the first part of the descent.

Optional stage 1570 includes controlling a horizontal progression direction of the air vehicle. It is noted that the horizontal progression direction may be kept substantially uniform during the entire course taken by the air vehicle (e.g. the entire course 1010 or 1020), but this is not necessarily so. For example, part of the course (e.g. the descent) may be carried out in substantially direct horizontal progression direction, while another part may include controlling turning of the course and modifying the horizontal progression direction. The controlling of stage 1570 may be carried out in parallel—or partly in parallel, to some or all of the previously disclosed stages.

The controlling of the horizontal progression direction may be carried out in response to a set horizontal progression direction—that may be fixed or changed from time to time. The determining of such a set horizontal progression direction may be based on various considerations—such as geometric considerations (e.g. distance from the destination location and current altitude), atmospheric conditions (e.g. wind), aerodynamic and/or energetic efficiency, operational considerations, capabilities of the air vehicle, and so forth.

While some parameters may be determined by a system (or person) implementing method 1500 (e.g. in stage 1590 thereof), some parameters may be determined to the system by another system, module, or person. In certain examples, some such parameters that may be defined before the controlling of method 1500 are as follows:

a. Where should the air vehicle land or hover? (e.g. what is the hover destination position? What is the final landing destination?)
b. At what height should the air vehicle hover?
c. From which direction should the air vehicle arrive? (e.g. against the wind, at an azimuth of 271°, when a captured image by a camera mounted on the air vehicle matches one or more reference images, etc.)
d. At what access angle should the air vehicle descend?
e. What are the horizontal ranges allocated to some or all of the different sub-stages?
f. What are the timing constrains for the landing?

While not necessarily all of these parameters are determined in advance, it is possible that all of them (or any sub-combination thereof, e.g. including parameters a, b, c, d, and e but not f, and so forth) are determined in advance. The controlling of the different stages (1510 through 1550, and 1570) may depend directly on these parameters (or some of them, depending on the stage), but may also depend on parameters determined in stage 1590 based on these parameters. It is noted that these parameters—or parameters similar thereto—may also be determined for the various stages of method 1600 described below.

Figure 3B:
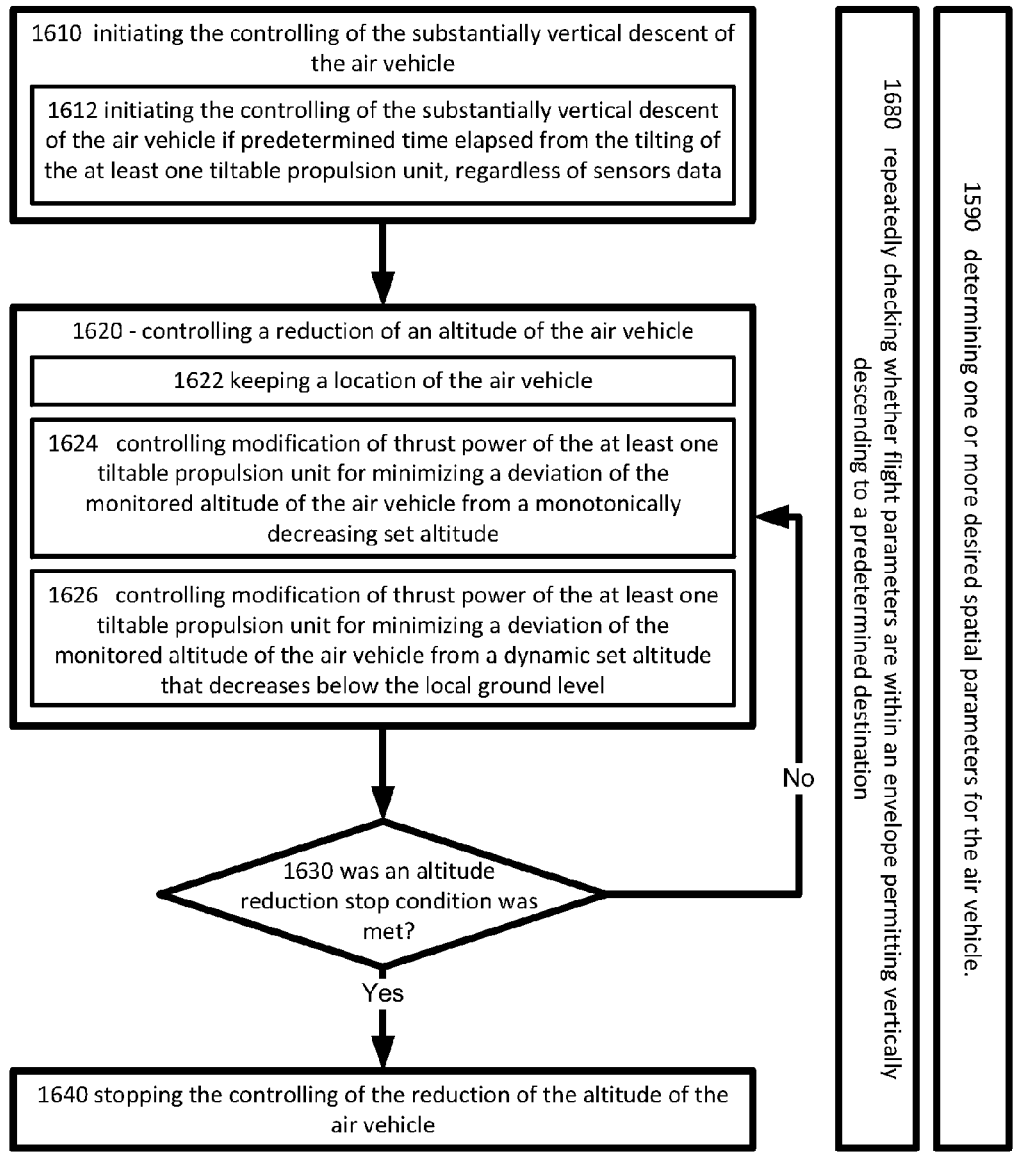
FIG. 3B is a flow chart of a method for controlling a substantially vertical descent of an air vehicle, according to an embodiment of the invention.

FIG. 3B is a flow chart of method 1600 for controlling a substantial vertical descent of an air vehicle, according to an embodiment of the invention. The air vehicle of method 1600 may include at least one tiltable propulsion unit, and may be the air vehicle of method 1500. It will however be clear to a person who is of skill in the art that method 1600 may be implemented for other types of air vehicles as well, such as helicopters.

Stage 1550 includes controlling of the reducing of the groundspeed of the air vehicle of method 1500 substantially to a hover, and may be followed by the stages of method 1600 that includes controlling a substantially vertical descent of an air vehicle—potentially until it has landed. However, method 1600 may also be implemented independently of method 1500—e.g. if the air vehicle was brought to a substantial hover in another way. In an example in which method 1600 is carried out after method 1500, the controlling of the vertical descent of the air vehicle may be carried out during part 1017 of course 1010 illustrated in FIG. 4A. The vertical descent illustrated by part 1017 may end with a landing on the ground (denoted 1018).

Generally, method 1600 may include controlling a substantially vertical descent of the air vehicle, after the reducing of the groundspeed of the air vehicle substantially to hover, until a fulfillment of at least one ground detection condition. Alternatively, the controlling of the substantially vertical descent may be continued until a fulfillment of another decision rule—such as reaching a predetermined hovering height that is lower than a hovering height in which the air vehicle substantially hovered prior to the substantially vertical descent. The controlling of the substantially vertical descent may be implemented by carrying out method 1600, but this is not necessarily so.

It is noted that method 1600 includes several stages of controlling, as is disclosed below in detail. Such controlling may be implemented in various ways. Such controlling may be implemented by a pilot, by another person onboard, or by a remote human operator (e.g. for an unmanned tilt rotor air vehicle). However, method 1600 may also be implemented by one or more computerized systems (e.g. as exemplified in relation to system 1200). Such a system may be mounted onboard the air vehicle of method 1600, or externally, and multiple such systems may coordinate to implement method 1600 (wherein each stage of the method may be implemented by a single system or a combination of such computerized systems). Additionally, a combination of one or more human controllers and one or more computerized systems may also be implemented.

According to an embodiment of the invention, the controlling of the descending course and the controlling of the reducing of the groundspeed (both of which are disclosed in greater detail below) include automated controlling by at least one processor of a control unit mounted on the air vehicle. It is noted that such processors and/or other computerized systems may be a dedicated system (implemented in hardware, firmware, etc.), and may also be implemented in software run by a processor of another system mounted on the air vehicle.

It is also noted that different stages of method 1600 include controlling (e.g. controlling a reduction of an altitude of the air vehicle in stage 1620). While not necessarily so, in each of the controlling stages method 1600 may possibly also include the carrying out of the controlled operation, even if not explicitly elaborated so. Continuing the same example, in addition to the controlling of stage 1620, method 1600 may further include reducing the altitude of the air vehicle.

Stage 1610 of method 1600 includes initiating the controlling of the substantially vertical descent of the air vehicle. The initiating of the controlling of the substantial vertical descent may be carried out based on different parameters, e.g. any one or more of the following parameters—determining that the aircraft reached a substantial hover, determining that it arrived at the destination location, a state of the airplane (e.g. remaining energy level), time elapsed from initiation of the controlling of the descent or any other identified stage, and so on. Referring to the examples set forth in the previous drawings, stage 1610 may be carried out by a control unit such as control unit 1220.

Stage 1610 may include stage 1612 of initiating the controlling of the substantially vertical descent of the air vehicle if predetermined time elapsed from the tilting of the at least one tiltable propulsion unit, regardless of sensors data. That is, even if the sensors data neither indicate that the groundspeed of the air vehicle was reduced to substantial hover, nor that the air vehicle arrived at the destination location (or another expected condition is not met), the controlling of the substantially vertical descent may still be initiated, in view of the time elapsed. Of course, stage 1612 is not implemented if the air vehicle of method 1600 does not include a tiltable propulsion unit.

It is noted that the time reference of stage 1612 may be the time of the tilting (as indicated above), but may also be replaced by (or be in addition to) a time reference pertaining to any of the other stages of method 1500—e.g. the time in which the substantially horizontal flight of stage 1552 began.

The initiation of the controlling of the substantially vertical descent, regardless of sensors data, may be implemented for several reasons. For example, the sensors data may be faulty (e.g. an airspeed sensor or a location sensor may be faulty). In another example, such initiation, irrespective of the sensors data, may be implemented for saving energy—e.g., even if the air vehicle did not reach the destination location, doing so may take too much time and energy (e.g. due to a strong headwind), so that landing after a predetermined time (or, when measuring that energy levels dropped below a predetermined level) may be implemented. In yet another example, it is noted that a preceding stage may not have been completed correctly (e.g. there was an error in the navigation of the air vehicle in a preceding stage), and therefore other stop-conditions may not be met ever in some scenarios.

Referring to the stages of method 1500, it is noted that initiation of different stages may be determined based on sensors data (e.g. initiation of the substantially horizontal flight in optional stage 1552 may be based on an altitude meter), but may also be determined based on the time elapsed from any predetermined point in time (e.g. from the initiation of one or more of the preceding stages).

Stage 1620 of method 1600 includes controlling a reduction of an altitude of the air vehicle. The controlling of the reduction of the altitude may include controlling various aerodynamic subsystems of the air vehicle. It may include controlling the thrust of one or more propulsion units directed in the general vertical thrust vector direction (e.g. a tiltable propulsion unit, a non-tiltable propulsion unit). It may also include controlling of additional aerodynamic subsystems of the air vehicle (such as those exemplified above), e.g. for controlling yaw, pitch, and/or roll of the air vehicle during the altitude reduction.

It should be noted that the course of the air vehicle during the descent of stage 1620 is not necessarily a strictly monotonic descending one, and that while an altitude of the air vehicle at an end of the descent is substantially lower than its altitude at a beginning of the descent, the air vehicle may nevertheless experience some temporary ascents (e.g. due to unexpected winds or air conditions, due to moving of control surfaces of the air vehicle, and even as effects of actions taken as part of controlling another aspect of the air vehicle—e.g. in order to keep the air vehicle within an envelope that ultimately permits landing of the air vehicle).

Controlling of the reduction of the altitude of the air vehicle may be achieved at least by controlling an operation of one or more of the aerodynamic subsystems of the air vehicle. Such parts may include, by way of example, the at least one tiltable propulsion unit, at least one non-tiltable propulsion unit, a throttle, an engine, ailerons, elevators, rudder, ruddervator, flaperons, elevons, wing flaps, slats, spoilers, air brakes, variable-sweep wings, non-tiltable propulsion unit, blades of rotors, and so on. It is noted that different stages of method 1600 (e.g. the controlling of stage 1620) may include controlling an operation of at least one aerodynamic subsystem of the air vehicle selected from a group consisting of an aileron, an elevator, a rudder, a ruddervator, a flaperon, elevons, and a wing flap.

The controlling of stage 1620 may include controlling modification of thrust power of such a propulsion unit (e.g. the at least one tiltable propulsion unit) for minimizing a deviation of the monitored altitude of the air vehicle from a dynamic set altitude that is changed from time to time. The set altitude may be modified continuously, but not necessarily so. Possibly, the set altitude may be a monotonically decreasing set altitude, and is potentially monotonically decreasing in a constant rate (e.g. 0.2-0.6 meters per second). The groundspeed of the air vehicle during altitude reduction (and/or during touchdown, if implemented) may be restricted, e.g. to under 2 kts.

It is noted that during stage 1620, stage 1622 may also be carried out, including keeping a location of the air vehicle. The keeping of the location may be made with respect to local ground (e.g. using a camera, a RADAR, etc.), or to other location indicative means—such as an inertial navigation system and/or a GPS system. The keeping of the location may be responsive to a measured location (e.g. based on GPS) or in response to measured groundspeed (e.g. GPS and/or Doppler). It is noted that those two do not always coincide.

Stage 1620 may be implemented as optional stage 1624 that includes controlling modification of thrust power of the at least one tiltable propulsion unit for minimizing a deviation of the monitored altitude of the air vehicle from a monotonically decreasing set altitude.

Stage 1620 may be implemented as optional stage 1626 that includes controlling modification of thrust power of the at least one tiltable propulsion unit for minimizing a deviation of the monitored altitude of the air vehicle from a dynamic set altitude that decreases below a local ground level. Having the set altitude decrease below the local ground level may be used in scenarios of landing, in which the air vehicle is controllably lowered to local ground level.

When attempting to minimize the deviation of the monitored altitude from the set altitude, if the monitored altitude is significantly higher than the set altitude at a given moment, the controlling may include reducing thrust level of the propulsion unit (and vice versa). Reduction of the thrust level may result in lowering of the monitored altitude—and thus in a reduction of the altitude deviation.

If the set altitude is set to a level that is sufficiently lower than the local ground level, then even if the monitored altitude is measured with some errors, it is likely to be higher than the set altitude. That is—even if the air vehicle touched the ground without a proper sensor identifying it, the thrust of the propulsion unit will nevertheless be reduced, due to deviation between the local ground level measured altitude and the set altitude that is sufficiently lower therefrom. All the more so, if the set altitude is monotonically decreased, the reducing of the thrust power of the at least one propulsion unit may be gradual.

It is noted that the thrust levels are not necessarily restricted as exemplified in FIG. 5 (even though the decreasing rate of the thrust may nevertheless still be restricted), and therefore such lowering of the set altitude may result in the gradual decreasing of the thrust power to zero. The degree to which the set altitude goes below the local ground level may depend on various parameters.

Such parameters may include, for example, expected errors in one or more of: the measured altitude, the local ground altitude; the lowering rate (e.g. depending on the permitted thrust reduction rate), the external conditions, the physical dimensions of the air vehicle, the strength of the air vehicle, and so forth. For example, the set altitude may be lower than the local ground level altitude, more than five times the height dimension of the air vehicle, more than ten times that height of the air vehicle, more than twenty times that height, and the like.

Stage 1620 may be implemented as controlling modification of thrust power of the at least one tiltable propulsion unit for minimizing the deviation of the monitored altitude of the air vehicle from a monotonically decreasing set altitude that decreases below the local ground level more than five times the height of the air vehicle.

Even if this mechanism is implemented as a safety mechanism, other mechanisms may also be implemented for determining when to stop the controllable reduction of altitude—e.g. when the air vehicle is determined to have reached a destination height and/or has landed.

Stage 1630 of method 1600 includes determining whether an altitude reduction stop condition was met. Such an altitude reduction stop condition may be a ground detection condition, but this is not necessarily so, and other altitude reduction stop conditions may be implemented—in addition to or instead of a ground detection condition.

Some altitude reduction stop conditions which may be implemented in various implementations of the invention are:
1. Did an input from a ground detection sensor (whether dedicated to ground detection or not) indicate detection of ground? Such a ground detection sensor may be, for example, an acceleration sensor, a RADAR altimeter; an ultrasonic sensor, a laser sensor, an optical sensor (e.g. a camera), a RADAR, wheels pressure sensor (or other landing gear pressure sensor), and so forth.
2. Did a predetermined time elapse from the initiating of stage 1610? This may include determining to stop the altitude reduction if a maximum time threshold elapsed, and may also include preventing a stopping of the altitude reduction if insufficient time elapsed (thereby preventing, for example, unplanned killing of engine when the air vehicle did not yet land, if a sensor provided an erroneous result).
3. Was a thrust level reduced below a predetermined level (e.g. due to the deviation from the set altitude described above)?

It is noted that the controlling of the modification of the thrust power in stage 1620 may be based, at least in part, on data gathered from the sensors that also operate as the ground detection sensors.

If the altitude reduction condition (or conditions) is met, the method may continue with stopping the controlling of the reduction of the altitude of the air vehicle (denoted 1640). It may also include stopping an operation of an engine of the air vehicle or other systems thereof—especially if the altitude reduction carried out was for landing the air vehicle.

If the altitude reduction was carried out for hovering at a lower altitude, method 1600 may continue with controlling maintaining of an altitude and location of the air vehicle. The stopping of the altitude reduction may also be accompanied by an activation of one or more air vehicle systems.

Significantly, stage 1640 may be preceded by triggering an activation of ground detection sensors (and/or triggering of accepting data received therefrom as sufficient for an altitude reduction stop condition). Since the ground detecting sensors may not be very accurate and may be prone to errors, activation of those sensors for ground detection may be triggered at a half-way stage during the altitude reduction. For example, the sensors may be so activated at a height of one or two meters, at a height equal to the height dimension of the air vehicle or twice that height, and so forth.

If method 1600 includes stopping of one or more engines of the air vehicle, such stopping may be carried out gradually. In an exemplary implementation, during the first 15 seconds of the stopping, the stopping is gradual and slow. After that time the stopping may accelerate.

Method 1600 may further include optional stage 1690 of determining values for course setting parameters for the air vehicle, but this is not necessarily so. Possibly, at least some of the parameters for which values are determined at stage 1690 may not be set parameters or targets whose achieving by actual performance of the air vehicle should be attempted or desired, but rather parameters that define ends of set or permitted range (e.g. of a determined envelope that ultimately permits deceleration to substantial hover at a predetermined hover destination position). For example, the determining of stage 1690 may include determining set pitch, but may also include (in addition to or alternatively) defining a range of permitted pitch angles, wherein deviation from this range results in immediate actions taken to counter this pitching deviation.

It is noted that stage 1690 may be carried out before and/or during any other stage of method 1600 for which such parameters may be used (e.g. values of parameters that pertain to the controlling of the thrust in stage 1626 may be determined prior to the carrying out of stage 1626 and/or in parallel to it). It is noted that the determining of such values may be initiated in response to an initiation of any one or more stages of method 1600, but this is not necessarily so and such values may be also determined, for example, routinely during the flight of the air vehicle.

Method 1600 may also include stage 1680 of repeatedly checking whether flight parameters are within an envelope permitting vertically descending to a predetermined destination. Such a destination may be a landing destination and may be a hovering destination, depending on the implementation. The repeated checking may be carried out at regular or irregular intervals, and each instance may be triggered by time or based on one or more measured parameters.

The repeated checking may start, for example, with the initiating of stage 1610 and until an end of the vertical descent. By way of example, the repeated checking may be carried out at least until a first occurrence of an event selected from (a) receiving a negative result and (b) end of the descent.

If a negative result is received in the checking (i.e. if at least one of the flight parameters exceeds such an envelope), the method may include either an aborting of the landing/descending to a hover process, but may also include reiterating some parts of the method—e.g. in either the first or the second flight mode, re-entering the envelope, and going through the sequence of stages (starting at 1610) to a successful result.

It should be noted that even if the result of the checking is negative, the response is not necessarily trying again to land (or otherwise to descend). For example, another alternative is to reenter flight mode, and to return to the first flight mode.

Referring to both methods 1500 and 1600, it is noted that each of these methods may be implemented by using a program storage device readable by machine, tangibly embodying a computer readable code portion executable by the machine for performing method 1500 and/or method 1600. Different implementations of such a program storage device and the program of instructions embodied therein may correspond to the various aforementioned implementations of method 1500 and 1600, even if not explicitly elaborated. It is noted that control system 1200 may include such a program storage device (e.g. database 1230), and may otherwise have access to such a program storage device.

For example, a program storage device, readable by machine is disclosed, such a program storage device tangibly embodying a computer readable code portion executable by the machine for controlling a deceleration process of an air vehicle which includes at least one tiltable propulsion unit, each of the at least one tiltable propulsion units is tiltable to provide a thrust whose direction is variable at least between a general vertical thrust vector direction and a general longitudinal thrust vector direction with respect to the air vehicle, the computer readable code portion includes instructions for: (a) during a descent of the air vehicle, controlling a descending course of the air vehicle based on at least monitored airspeed and monitored altitude of the air vehicle, the controlling including carrying out in the following order: (i) in a first part of the descent, controlling an operation of the at least one tiltable propulsion unit to provide thrust in the general longitudinal thrust vector direction for propelling the air vehicle; and (ii) following a tilting of the at least one tiltable propulsion unit, controlling in a second part of the descent an operation of the at least one tiltable propulsion unit to provide thrust in the general vertical thrust vector direction for providing lift to the air vehicle; and (b) controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle.

The instructions for controlling the descending course and the instructions for controlling the reducing of the groundspeed may include instructions for automated controlling by at least one processor of a control unit mounted on the air vehicle.

The instructions for controlling of the deceleration process may include controlling the deceleration process of the air vehicle that includes a wing, and balancing between contradictory aerodynamic effects resulting from the wing and from the at least one tiltable propulsion unit.

The instructions for controlling of the reducing of the groundspeed may include instructions for carrying out at least part of the controlling of the reducing of the groundspeed carried out after the controlling of the descending course of the air vehicle, during a substantially horizontal flight of the air vehicle.

The program storage device may further embody instructions for controlling, during at least the second part of the descent, reduction of the groundspeed below a maximum permitted threshold speed before an end of the descent and before a beginning of the substantially horizontal flight of the air vehicle.

The program storage device may further embody instructions for minimizing a vertical deviation of the air vehicle from a set altitude concurrently with at least a part of the controlling of the reducing of the groundspeed, and instructions for restricting the minimizing at least by the restricting of the reduction of the thrust power based on the lower threshold.

The program storage device may further embody instructions for further restricting the minimizing, by restricting a rate of thrust power reduction based on a maximal permitted thrust power reduction rate.

The program storage device may further embody instructions for determining the set groundspeed in response to a distance of the air vehicle from a predetermined hover destination position.

The program storage device may further embody instructions for repeated checking, starting at the first part of the descent and at least until a first occurrence of an event selected from (a) receiving a negative result and (b) reduction of the groundspeed to substantial hovering, if flight parameters are within an envelope permitting deceleration to hover at a predetermined hover destination position; and instructions for selectively instructing tilting of the at least one tiltable propulsion unit to provide thrust in the general longitudinal thrust vector direction if a result of the checking was negative, and controlling a directing of the air vehicle to a position and a state in which the flight parameters are within the envelope, and reinitiating the method, starting again with the controlling during the first part of the descent.

The program storage device may further embody instructions for determining timing for tilting of the at least one tiltable propulsion unit between the first and the second parts of the descent for minimizing a duration between the tilting and the substantial hover.

The instructions for the controlling of the reducing of the groundspeed may include instructions for restricting the reduction of the groundspeed for preventing a reduction of the airspeed below a predetermined threshold until reaching a vicinity of a predetermined hover destination position.

The program storage device may further embody instructions for keeping a pitch of the air vehicle within a permitted pitch range concurrently with at least a part of the controlling of the reducing of the groundspeed, wherein the permitted pitch range is dynamically determined in response to the measured airspeed of the air vehicle.

The program storage device may further embody instructions for determining, prior to the controlling in the second part of the descent, a permitted air vehicle descending angle for at least a part of the descending course based on atmospheric conditions, wherein the controlling of the descending course during at least a part of the first part of the descent is based on the permitted air vehicle descending angle.

The program storage device may further embody instructions for controlling a substantially vertical descent of the air vehicle, after reducing the groundspeed of the air vehicle substantially to hover, until a fulfillment of at least one ground detection condition.

The program storage device may embody instructions for controlling a reduction of an altitude of the air vehicle during at least a part of the vertical descent, wherein the controlling of the reduction of the altitude may include controlling modification of thrust power of the at least one tiltable propulsion unit for minimizing a deviation of the monitored altitude of the air vehicle from a monotonically decreasing set altitude that decreases below a local ground level, more than five times the height of the air vehicle.

The program storage device may further embody instructions for initiating the controlling of the substantially vertical descent of the air vehicle if predetermined time elapsed from the tilting of the at least one tiltable propulsion unit, regardless of sensors data.

The instructions for the controlling of the descending course may include instructions for controlling an operation of at least one aerodynamic part of the air vehicle selected from a group consisting of an aileron, an elevator, a rudder, a ruddervator, a flaperon, elevons, and a wing flap.

FIG. 7 illustrates a possible exemplary flight course 1030 of air vehicle 100, during which it decelerates, according to an embodiment of the invention. Several sub-stages are exemplified in course 1030, which may correspond to stages of methods 1500 and 1600, and to control by control system 1200.

In a first stage 1910, the descending process is engaged. The determination of triggering the descending process may be taken autonomously by control system 1200 (e.g. due to a preplanned flight plan, due to remaining fuel level, or due to operational conditions such as weather, etc.), and may also be determined by another system or person. For example, control system 1200 may receive an instruction to land the air vehicle in a predetermined location, and possibly at a predetermined time. At the time of engaging the descending process, the airspeed of the air vehicle may be its cruising airspeed, or any speed at which it traveled before. If a descent is planned in advance, this speed may be lowered prior to engaging in the descent. In the illustrated example, the airspeed of the air vehicle when the descending process is engaged is about 35 kts. The speed of 35 kts is merely an example, as the actual velocity depends on many implementation factors such as the type of the air vehicle, its weight, the profile of the wing, environmental factors, etc.

Stage 1920 that follows includes a descending flight in the first flight mode, when the at least one tiltable propulsion unit 420 provides thrust in the general longitudinal thrust vector direction. While not necessarily so, the non-tiltable propulsion unit 420c (if implemented) does not provide any substantial thrust at this stage. The envelope permitting descent to a substantial hover (illustrated by envelope 2000) is relatively large at this stage. Stage 1920 may or may not include deceleration of the air vehicle, and may—in an example—include keeping a substantially constant groundspeed of the air vehicle during that stage. The descending in stage 1920 may be achieved primarily by pitching the air vehicle down. The tendency to accelerate resulting from the descending course (and the potential gravitational energy) may be compensated by slowing down the engines, creating drag, etc.

In stage 1930, the air vehicle switches to the second flight mode—essentially by tilting the at least one tiltable propulsion units to provide thrust in the general vertical thrust vector direction. The thrust, previously used only for propelling the air vehicle (when lift is provided by the wing and potentially other surfaces), is directed in this state to provide lift to the air vehicle, while also propelling it. Stage 1930 may also include activation of the previously inoperative non-tiltable propulsion unit 420c. In the illustrated example, the tilting is carried out at a height of some 70 m, and at a distance of 500-600 m from the target. The location and/or timing of the tilting may be determined based on energy consumption minimization considerations. The tilting may or may not include braking of rotating parts of the tiltable propulsion units. The distances and height provided above are merely an example, and the actual values depend on many implementation factors, such as the ones discussed above.

In stage 1940, the air vehicle continues to descend, now in the second flight mode, when the at least one tiltable propulsion unit provides thrust in the general vertical thrust vector direction. It is noted that possibly, the course may include an intermediary stage between stage 1920 and stage 1940, in which the at least one tiltable propulsion unit is directed in a diagonal tilt, providing thrust in an intermediary direction between the general vertical thrust vector direction and the general longitudinal thrust vector direction. Stage 1940 may or may not include deceleration of the air vehicle. For example, at an end of stage 1940, the airspeed of the air vehicle may be reduced to about 90% of its initial value—e.g. to 32 kts. Other values may also be implemented (e.g. 50-60%, 60-70%, 70-80%, about 85%, about 95%, etc.). The groundspeed may be kept substantially constant during stage 1940, but this is not necessarily so.

Stage 1950 includes slowing down the descent rate (possibly to substantially horizontal height). The slowing down of the descent rate may enable more substantial slowing down, because less potential gravitational energy is converted to kinetic energy each second. Therefore, stage 1950 may include a more significant slowing down than the preceding stages. For example, the airspeed of the air vehicle may be reduced from the former 32 kts down to about 25 kts, a decrease of about 20%. Like before, the rate of airspeed decrease during stage 1950 may be different in different implementations—ranging from zero and up, e.g. 5-10%, 10-20%, 20-30%, etc. In the illustrated example, stage 1950 starts at a distance of some 200 from the hover destination location, and at an altitude of 10 m. The altitude in which stage 1950 starts may be defined in relation to the ground (e.g. 10 m), but may also be defined in multiplications of the horizontal flight altitude or the hover destination location hovering altitude.

In the illustrated example, the rate of slowing down is much higher than that of stage 1940. In stage 1940, the airspeed was reduced by 10% along some 350 m, while in stage 1950 the airspeed is slowed down twice as much—by about 20%—along a much shorter 100 m range. The length of stage 1950 may be determined by geometrical considerations (e.g. distance from the hover destination location) as well as other considerations.

In stage 1960 the airspeed of the air vehicle is further reduced. Stage 1960 may include substantially horizontal flight, but this is not necessarily so. The rate of airspeed reduction may depend both on aerodynamic considerations (e.g. airspeed, stall angle, wind speed, etc), as well as on groundspeed considerations—the distance from the hover destination location, etc. The altitude at which the air vehicle flies in stage 1960 may be determined based on various factors—e.g. size of the air vehicle, geometry of the terrain, wind, altitude sensor error rate, operational considerations, and so forth. Stage 1960 may continue until a final substantial stop at the hover destination location, but at it end stage 1965 of controlled rising of the air vehicle may be implemented—e.g. for diminishing the residual groundspeed.

Potential stage 1970 may include hovering and keeping location (e.g. with respect to ground, to GPS data etc.). The duration of stage 1970 may depend on various factors, such as time taking to sufficiently stabilize, operational considerations, etc.

In stage 1980 the air vehicle is lowered while keeping its location. At some point during the lowering, the ground detection sensors may be triggered, so that hitting the ground may be detected (if lowering to a landing). At an ultimate stage, when detecting landing on ground, the engines may be stopped.

The total time span from start of the descent process to substantial hover and possibly to the landing may last different durations in different implementations and under various conditions. The timing greatly depends, for example, on size and weight of the air vehicle, aerodynamic capabilities thereof, power of the engines, weather conditions, initial altitude of the air vehicle, course setting parameters, and so forth. By way of example only, for a 70 Kg unmanned air vehicle in the course exemplified with relation to FIG. 7, the total time span—from start to end—may be between 15 and 30 seconds.

Figure 8:
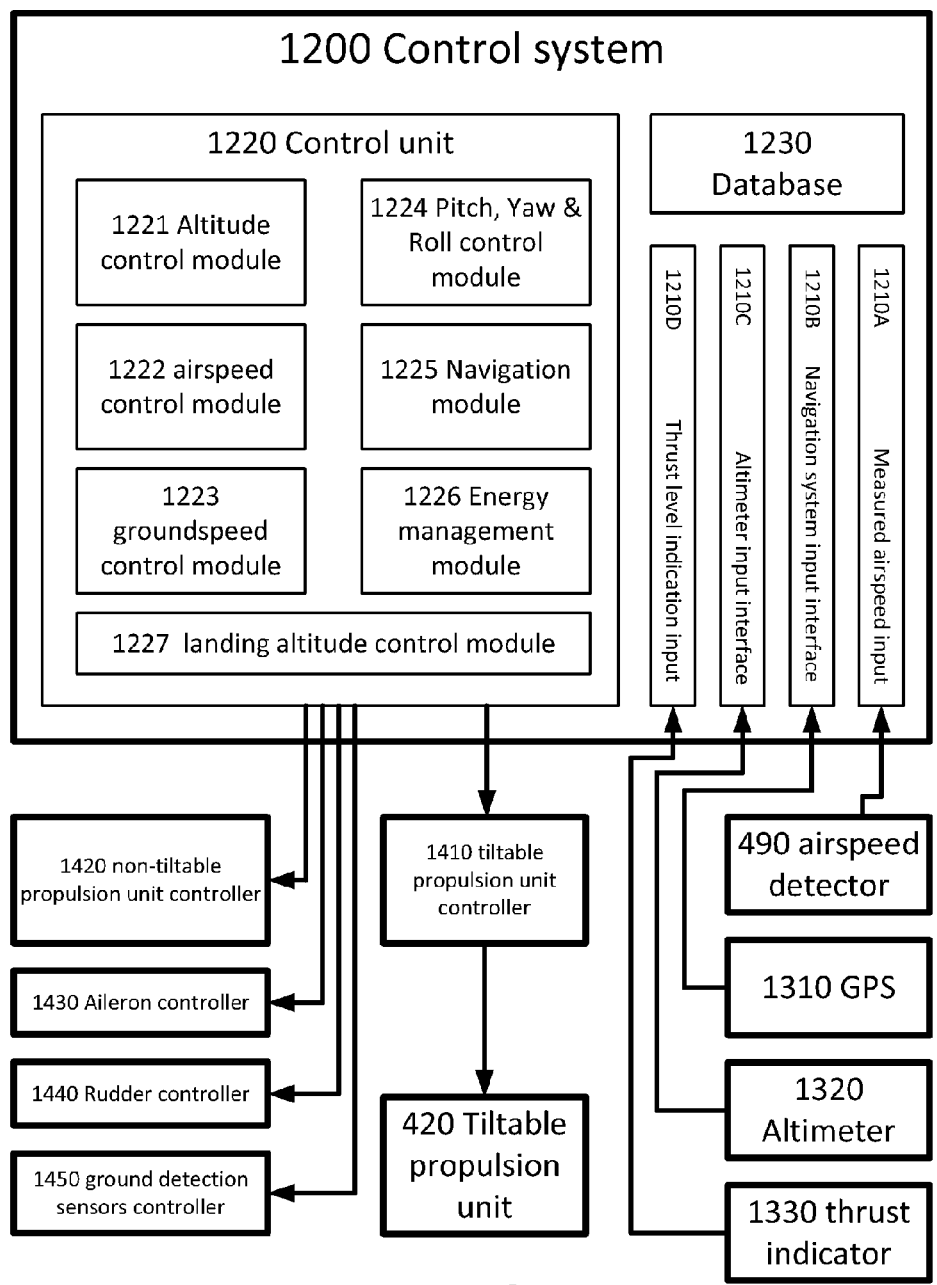
FIG. 8 schematically illustrates a control system, according to an embodiment of the invention.

FIG. 8 schematically illustrates control system 1200, according to an embodiment of the invention, as well as its environment. Control system 1200 includes one or more input interfaces 1210, for receiving from one or more external systems (e.g. sensors, detectors, controllers, navigation systems, etc.) information indicative of various parameters of air vehicle 100 and possibly of its environment. For example, such information may pertain at least to the monitored airspeed of air vehicle 100 and to its monitored altitude. It should be noted that the indicative information does not necessarily include the value of the respective measured parameters, and such a value may also be deduced by control unit 1200 based on information received from one or more sources.

A measured airspeed input interface 1210A may be implemented for receiving information indicative of the measured airspeed of air vehicle 100, from one or more airspeed detectors 490 (e.g. a Pitot tube). One or more navigation system input interfaces 1210B may be implemented to receive navigational information from a respective navigation system such as GPS system 1310, from an inertial navigation system, from a camera based navigation system, and so forth. An altimeter input interface 1210C may be implemented to receive measured altitude information from an altimeter 1320 mounted on the air vehicle. A thrust level indication input 1210D may be implemented to receive information from one or more thrust level indicators 1330.

Other types of input interfaces may also be implemented, as will be clear to a person who is of skill in the art. It should be noted that the systems from which information is received are not necessarily mounted on the air vehicle, and are not necessarily sensors. For example, information may also be received from controllers of various systems of the air vehicle 100, providing status information regarding their status. Also, information may also be received from other aircraft and from ground stations. Furthermore, other inputs may be implemented in control system 1200 for receipt of instructions—e.g. destination location, course setting instructions, landing instructions, and so forth.

Control unit 1220 may be implemented as a multitude of modules that may or may not communicate with each other. Each of the modules may be implemented on its own processor or by using dedicated hardware, but this is not necessarily so. It is also noted that control unit 1220 may be implemented as part of another control system of air vehicle 100, that is configured to control other aspects thereof (e.g. general navigation control system, a failure detection system, and so forth).

By way of example, some control modules are exemplified below. It will however be understood by a person who is of skill in the art that the implementation of the disclosed control unit is not restricted to the examples given. It is noted that the limitations and limiters discussed below may be implemented by hardware and/or by software. For example, limitation of thrust level may be implemented by actual restriction of throttle movement (in hardware) and/or by restriction of allowed parameters range (in software).

An altitude control module 1221 may be implemented for controlling the altitude of air vehicle 100. This module may use information received from the altimeter input interface 1210C, and, based on a comparison of that measured altitude information with a set altitude, determine what actions should be taken by one or more systems of air vehicle 100. The altitude control module 1221 may set the set altitude, but this altitude may also be determined by a course setting module 1226. Some of the modules of the control unit 1220, such as course setting module 1226, may be modules that do not control systems of the air vehicle 100.

An airspeed control module 1222 may be implemented for controlling the airspeed of air vehicle 100. This module may use information received from an airspeed detector 490, and based on a comparison of the measured airspeed with a set airspeed and/or based on differences between measured groundspeed to a set groundspeed, determine what actions should be taken by one or more systems of air vehicle 100. The airspeed control module 1222 may set the set airspeed, but this airspeed may also be determined by a course setting module 1226.

A groundspeed control module 1223 may be implemented for controlling the groundspeed of air vehicle 100. This module may use information received from a groundspeed detector (e.g. an optical groundspeed detector, navigation system 1310, etc.), and, based on a comparison of the measured groundspeed with a set groundspeed, and/or based on the airspeed of air vehicle 100, to determine what actions should be taken by one or more systems of air vehicle 100. The groundspeed control module 1223 may set the set groundspeed, but this groundspeed may also be determined by a course setting module 1226. Airspeed control module 1222 and groundspeed control module 1223 may also be implemented as a single speed control module.

Control unit 1220 may include a speed control module (e.g. groundspeed control module 1223 or a control module implemented as part of course setting module 1226) that is configured to determine the set groundspeed in response to a distance of the air vehicle from a predetermined hover destination position.

Other modules may also be implemented, such as (though not limited to) pitch, yaw, and roll control module 1224, navigation module 1225, energy management module, etc.

The control modules of control unit 1220 may interact with each other in order to prevent contradictory instructions or other undesired effects. For example, if altitude control module 1221 determines that a pitch of the air vehicle 100 should be reduced as well as the thrust produced by the tiltable propulsion unit 420 in the general vertical thrust vector direction, then it may query the respective modules (e.g. querying control module 1224 regarding the pitch) if such an action can be carried out. An instruction to the tiltable propulsion unit 420 and/or to other components of the air vehicle 100 may be issued in such an implementation only if the carrying out of which is not blocked by any of the participating control modules.

Control unit 1220 may include multiple limiters—either implemented as part of the various control modules or externally to it, which are used to limit the values of some parameters (e.g. pitch, throttle, etc.). These limiters may be implemented in software, in hardware, and/or in firmware.

The threshold values used for the limiting may be used to limit a potential exceeding of the air vehicle from permitted operational range, and may also be used for compensation of vehicle-specific response. For example, if the air vehicle 100 has a tendency to pitch up when airspeed drops and thrust increases, the limiters (or other control forms) may be used to limit the pitching up and compensating for this tendency.

The threshold limiting values may be calculated by one or more modules of the control unit 1220, but may also be gathered by those modules from a predefined database. For example, for any given airspeed, the pitch, yaw, and roll control module 1224 may query a look-up table (LUT), and use values stored in the LUT for this airspeed as the higher and lower pitch thresholds. Other control modules may just as well use look-up tables. Such LUTs may be stored, for example, in optional database 1230 of control system 1200.

The values retrieved from the look-up table (or other database) may be used as is, but may also serve as a basis for a change. Continuing the same example, control module 1224 may retrieve a nominal pitch value (e.g. used for correction and/or compensation) to which the pitch of the air vehicle should preferably be modified, and based on that nominal pitch value, to implement a control loop and then to correct the pitch accordingly. Such correction of nominal values derived from the one or more LUTs by the different control modules may be based on values of other parameters, and restricted using thresholds (e.g. as shown in FIGS. 5 and 6).

Some of the controllers to which control unit 1220 and its different control modules may issue commands are tiltable propulsion unit control 1410 controlling one or more of the at least one tiltable propulsion unit 420; non-tiltable propulsion unit control 1420 controlling one or more of the possibly implemented non-tiltable propulsion units; an aileron controller 346 for controlling one or more ailerons, if implemented; a rudder controller 1440 for controlling one or more rudders, if implemented. A ground detection sensors controller 1450 may be implemented for selectively activating the one or more ground detection sensors—e.g. at a predetermined altitude.

In an example, control unit 1220 (and different components thereof) may be configured to issue the controlling commands to the controllers of the aerodynamic subsystems for controlling an operation of at least one aerodynamic subsystem of the air vehicle selected from a group consisting of an aileron, an elevator, a rudder, a ruddervator, a flaperon, elevons, and a wing flap.

It should be noted that while not necessarily so, control unit 1200 may be configured to control the descending course of air vehicle 100 and the reducing of the groundspeed thereof automatically, and/or autonomously—without any external intervention.

It is noted that air vehicle 100 may include one or more wings 320. The wings and the propulsion units may have contradictory effects (e.g. while attempting to reduce lift by reducing a rotation speed of a rotor of the tiltable propulsion unit tiltable propulsion unit 420, the wing may increase its generated lift due to a change in pitch).

Changes in the angle of attack that increase the lift generated by the wind naturally reduces the relative lift which is ought to be provided by the engines to provide a constant overall lift. Over a certain angle, the lift provided by the wing is small and possibly even negligible, and changing the pitch of the air vehicle above that angle would result in modifying the flight direction only as depending on the power of the engines and the direction of the thrust. Thus, climbing of the air vehicle is enabled in such case without changing the pitching.

The transit between the first state in which the pitching angle affects the climbing of the air vehicle to the second state in which only the rotors affect the climbing is a gradual transition which occurs as part of the slowing down process (though not only then). During slowing down such a transition may start around the stalling velocity of the air vehicle, and the transition to that second state is concluded when the most of the weight of the air vehicle is supported by the power of the rotors. In this state, the control of the altitude of the air vehicle is done by controlling the engines.

All the more so, thrust airflow thrust by the tiltable propulsion unit 420 may be thrust onto the wing and modify the airflow around it, or have other aerodynamic effects on various aerodynamic subsystems of air vehicle 100. Control unit 1200 may be configured to balance between contradictory aerodynamic effects resulting from the wing and from the at least one tiltable propulsion unit.

As mentioned in relation to method 1500, part of the course of air vehicle 100 may be horizontal. The control unit 1200 may be configured to control the reducing of the groundspeed of the air vehicle during a substantially horizontal flight of the air vehicle (e.g. at least partly after the ceasing to control the descending course of the air vehicle).

As mentioned in relation to method 1500, the controlling of the air vehicle may include controlling a slowing down thereof during its descent. Control unit 1220 may be configured to control, during at least the second part of the descent, reduction of the groundspeed below a maximum permitted threshold speed before an end of the descent and before a beginning of the substantially horizontal flight of air vehicle 100.

As mentioned in relation to method 1500, in some implementations the keeping of the thrust levels within permitted range may over-ride and be prioritized over keeping of the air vehicle at a fixed height and/or at within its set altitude permitted range. Control unit 1200 may include altitude control module 1221 which in turn may be configured to minimize a vertical deviation of air vehicle 100 from a set altitude when the control unit 1200 controls the reducing of the groundspeed, and to restrict the minimizing at least based on the restricting of the reduction of the thrust power based on the lower threshold.

As mentioned in relation to method 1500, in some implementations the keeping of the rate of the reduction of may over-ride and be prioritized over the keeping of the air vehicle at a fixed height and/or at within its set altitude permitted range. The altitude control 1221 module may be configured to further restrict the minimizing by restricting a rate of thrust power reduction based on a maximal permitted thrust power reduction rate.

Either control unit 1200, another system of air vehicle 100, a pilot thereof, or a remote operator or a remote control system may be able to determine when to cancel the descent and/or slowing down to a hover process. For example, control unit 1200 may further include a monitor or other control module (not illustrated separately), configured to repeatedly check, starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position; wherein control unit 1200 is configured to selectively instruct tilting of the at least one tiltable propulsion unit 420 to provide thrust in the general longitudinal thrust vector direction if a result of the checking was negative, and to further control a directing of the air vehicle 100 to a position and a state in which the flight parameters are within the envelope. A process like the one disclosed in relation to method 1500 may be reinitiated, starting again with the controlling during the first part of the descent, but this is not necessarily so.

As aforementioned, the energy consumption of air vehicle 100 when in the second flight mode is substantially higher than when in the first flight mode. Control unit may therefore further include a tilting control module (not illustrated as a standalone module) that is configured to determine timing for tilting of the at least one tiltable propulsion unit 420 between the first and the second parts of the descent, for minimizing a duration between the tilting and the substantial hover.

Since premature slowing down of the air vehicle may be hard to overcome, control unit 1200 may be configured to restrict the reduction of the groundspeed for preventing a reduction of the airspeed below a predetermined threshold until reaching a vicinity of a predetermined hover destination position.

Referring to FIGS. 6 and 8, control unit 1200 may include a pitch control module (may be implemented as part of control module 1224) that is configured to keep a pitch of the air vehicle within a permitted pitch range when the control unit controls 1200 the reducing of the groundspeed (but not necessarily during all of the groundspeed reduction), wherein the permitted pitch range is dynamically determined in response to the measured airspeed of the air vehicle 100. That pitch control module may be configured to prevent stalling of the air vehicle at least by keeping the pitch within the permitted pitch range The access angle of air vehicle 100 may be controlled in various ways. For example, control unit 1220 may be configured to: (a) determine, before the second part of the descent (possibly even before the first part) a permitted air vehicle descending angle for at least a part of the descending course based on atmospheric conditions, and (b) control the descending course during at least a part of the first part of the descent based on the permitted air vehicle descending angle.

While not necessarily so, after the air vehicle is slowed down to substantially a hover, it may controllably be lowered down substantially vertically—e.g. for a landing of air vehicle 100 or to another hovering position. Control unit 1220 may be configured to control a substantially vertical descent of the air vehicle, after the reducing of the groundspeed of the air vehicle substantially to hover, until a fulfillment of at least one ground detection condition (or other condition, if being lowered to a hovering rather than to a landing).

The techniques detailed with relation to method 1600 may be implemented, as aforementioned, also with respect to control system 1200, and especially with respect to control unit 1220. For example, control unit 1220 may include a landing altitude control module 1227 that is configured to control a reduction of an altitude of the air vehicle 100 during at least a part of the vertical descent, and to control modification of thrust power of the at least one tiltable propulsion unit 420 when controlling the reduction of the altitude, for minimizing a deviation of the monitored altitude of the air vehicle 100 from a monotonically decreasing set altitude that decreases below a local ground level more than five times a height of the air vehicle. The variations discussed with relation to method 1600 (and especially with relation to stage 1620 thereof) may also be implemented with relation to system 1200 and to control unit 1220.

Control unit may further be configured to initiate the controlling of the substantially vertical descent of the air vehicle if predetermined time elapsed from the tilting of the at least one tiltable propulsion unit, regardless of sensors data.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A control system (1200) configured to control a deceleration process of an air vehicle (100) which comprises at least one tiltable propulsion unit (420), each of the at least one tiltable propulsion units is tiltable to provide a thrust whose direction is variable at least between a general vertical thrust vector direction and a general longitudinal thrust vector direction with respect to the air vehicle; the air vehicle further comprises a wing (320) configured to provide lift to the air vehicle; the wing being in a fixed position during flight of the air vehicle the control system comprising:

at least one input for receiving information indicative of monitored airspeed of the air vehicle and of monitored altitude of the air vehicle; and a control unit (1220), configured to issue controlling commands to controllers (1410, 1420, 1420, 1440, 1450) of aerodynamic systems (420, 345) of the air vehicle, the aerodynamic systems comprising the at least one tiltable propulsion unit; wherein the control unit is configured issue the controlling commands for:

a. controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and b. controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold (1720) that is determined in response to a measured airspeed of the air vehicle;

wherein the control unit is configured to control the reducing of the groundspeed of the air vehicle during a substantially horizontal flight of the air vehicle; and to control, during at least the second part of the descent, reduction of the groundspeed below a maximum permitted threshold speed before an end of the descent and before a beginning of the substantially horizontal flight of the air vehicle.

2. The system according to claim 1, wherein the control unit is configured to control the descending course and the reducing of the groundspeed automatically.

3. The system according to claim 1, wherein the air vehicle includes a wing (320), wherein the control unit is configured to balance between contradictory aerodynamic effects resulting from the wing and from the at least one tiltable propulsion unit.

4. The system according to claim 1, wherein the control unit comprises an altitude control module (1221) configured to minimize a vertical deviation of the air vehicle from a set altitude when the control unit controls the reducing of the groundspeed, and to restrict the minimizing at least based on the restricting of the reduction of the thrust power based on the lower threshold.

5. The system according to claim 4, wherein the altitude control module is configured to further restrict the minimizing by restricting a rate of thrust power reduction based on a maximal permitted thrust power reduction rate.

6. The system according to claim 1, wherein the control unit comprises a speed control module that is configured to determine the set groundspeed in response to a distance of the air vehicle from a predetermined hover destination position.

7. The system according to claim 1, wherein the control unit further includes a monitor, configured to repeatedly check, starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position;

wherein the control unit is configured to selectively instruct tilting of the at least one tiltable propulsion unit to provide thrust in the general longitudinal thrust vector direction if a result of the checking was negative, and to further control a directing of the air vehicle to a position and a state in which the flight parameters are within the envelope.

8. The system according to claim 1, wherein the control unit further comprises a tilting control module that is configured to determine timing for tilting of the at least one tiltable propulsion unit between the first and the second parts of the descent, for minimizing a duration between the tilting and the substantial hover.

9. The system according to claim 1, wherein the control unit is configured to restrict the reduction of the groundspeed for preventing a reduction of the airspeed below a predetermined threshold until reaching a vicinity of a predetermined hover destination position.

10. The system according to claim 1, wherein the control unit comprises a pitch control module (1224), configured to keep a pitch of the air vehicle within a permitted pitch range when the control unit controls the reducing of the groundspeed, wherein the permitted pitch range is dynamically determined in response to the measured airspeed of the air vehicle.

11. The system according to claim 10, wherein the pitch control module is configured to prevent stalling of the air vehicle at least by keeping the pitch within the permitted pitch range.

12. The system according to claim 1, wherein the control unit is configured to:

determine, before the second part of the descent, a permitted air vehicle descending angle for at least a part of the descending course based on atmospheric conditions, and control the descending course during at least a part of the first part of the descent based on the permitted air vehicle descending angle.

13. The system according to claim 1, wherein the control unit is configured to control a substantially vertical descent of the air vehicle, after the reducing of the groundspeed of the air vehicle substantially to hover, until a fulfillment of at least one ground detection condition.

14. The system according to claim 13, wherein the control unit comprises a landing altitude control module (1221) that is configured to control a reduction of an altitude of the air vehicle during at least a part of the vertical descent, and to control modification of thrust power of the at least one tiltable propulsion unit, when controlling the reduction of the altitude, for minimizing a deviation of the monitored altitude of the air vehicle from a monotonously decreasing set altitude that decreases below a local ground level more than five times a height of the air vehicle.

15. The system according to claim 14, wherein the control unit is configured to initiate the controlling of the substantially vertical descent of the air vehicle if predetermined time elapsed from the tilting of the at least one tiltable propulsion unit, regardless of sensors data.

16. The system according to claim 1, wherein the control unit is configured to issue the controlling commands to the controllers of the aerodynamic systems for controlling an operation of at least one aerodynamic system of the air vehicle selected from a group consisting of an aileron, an elevator, a rudder, a ruddervator, a flaperon, elevons, and a wing flap.

17. The system according to claim 1, wherein the control unit is further configured to reduce rotation speed of at least one rotating component of one or more of the at least one tiltable propulsion units between the first and the second parts of the descent, for reducing angular momentum on the at least one tiltable propulsion unit.

18. The system according to claim 1, wherein the air vehicle comprises at least one non-tiltable propulsion unit and the control unit is configured, during at least part of the second part of the descent, to control operating of at least one non-tiltable propulsion unit to provide thrust in the general vertical thrust vector direction.

19. A method (1500) for controlling a deceleration process of an air vehicle (100) which comprises at least one tiltable propulsion unit (420), each of the at least one tiltable propulsion unit is tiltable to provide a thrust whose direction is variable at least between a general vertical thrust vector direction and a general longitudinal thrust vector direction with respect to the air vehicle (100); the air vehicle further comprises a wing (320) configured to provide lift to the air vehicle; the wing being in a fixed position during flight of the air vehicle, the method comprising:

during a descent of the air vehicle (100), controlling (1510) a descending course of the air vehicle (100) based on at least monitored airspeed and monitored altitude of the air vehicle (100), said controlling comprising carrying out:

in a first part of the descent, controlling (1520) an operation of the at least one tiltable propulsion unit to provide thrust in the general longitudinal thrust vector direction for propelling the air vehicle (100); and following a tilting of the at least one tiltable propulsion unit, controlling (1540) in a second part of the descent an operation of the at least one tiltable propulsion unit to provide thrust in the general vertical thrust vector direction for providing lift to the air vehicle (100); and controlling (1550) a reducing of a groundspeed of the air vehicle (100) substantially to a hover, while the at least one tiltable propulsion unit provides thrust in the general vertical thrust vector direction, at least by:

controlling (1560) thrust power of the at least one tiltable propulsion unit for reducing a difference between measured groundspeed of the air vehicle (100) and set groundspeed, while restricting reduction of the thrust power based on a lower threshold (1720) that is determined in response to a measured airspeed of the air vehicle;

controlling the reducing of the groundspeed of the air vehicle during a substantially horizontal flight of the air vehicle, and controlling, during at least the second part of the descent, reduction of the groundspeed below a maximum permitted threshold speed before an end of the descent and before a beginning of the substantially horizontal flight of the air vehicle.

20. The method according to claim 19, wherein the controlling (1510) of the descending course and the controlling (1550) of the reducing of the groundspeed comprises automated controlling by at least one processor of a control unit mounted on the air vehicle (100).

21. The method according to claim 19, wherein the controlling of the deceleration process comprises controlling the deceleration process of the air vehicle that includes a wing, and balancing between contradictory aerodynamic effects resulting from the wing and from the at least one tiltable propulsion unit.

22. The method according to claim 19, wherein at least part of the controlling (1550) of the reducing of the groundspeed is carried out after the controlling (1510) of the descending course of the air vehicle, during a substantially horizontal flight of the air vehicle.

23. The method according to claim 22, further comprising controlling, during at least the second part of the descent, reduction of the groundspeed below a maximum permitted threshold speed before an end of the descent and before a beginning of the substantially horizontal flight of the air vehicle.

24. The method according to claim 19, further comprising minimizing a vertical deviation of the air vehicle (100) from a set altitude concurrently with at least a part of the controlling (1550) of the reducing of the groundspeed, wherein the minimizing is restricted at least by the restricting of the reduction of the thrust power based on the lower threshold.

25. The method according to claim 24, wherein the minimizing is further restricted by restricting a rate of thrust power reduction based on a maximal permitted thrust power reduction rate.

26. The method according to claim 19, further comprising determining the set groundspeed in response to a distance of the air vehicle (100) from a predetermined hover destination position.

27. The method according to claim 19, further comprising:

repeatedly checking (1580), starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position; and selectively instructing tilting of the at least one tiltable propulsion unit to provide thrust in the general longitudinal thrust vector direction if a result of the checking was negative, and controlling a directing of the air vehicle (100) to a position and a state in which the flight parameters are within the envelope, and reinitiating the method (1500) starting again with the controlling (1510) during the first part of the descent.

28. The method according to claim 19, further comprising determining (1534) timing for tilting of the at least one tiltable propulsion unit between the first and the second parts of the descent for minimizing a duration between the tilting and the substantial hover.

29. The method according to claim 19, wherein the controlling (1550) of the reducing of the groundspeed comprises restricting the reduction of the groundspeed for preventing a reduction of the airspeed below a predetermined threshold until reaching a vicinity of a predetermined hover destination position.

30. The method according to claim 19, further comprising keeping a pitch of the air vehicle (100) within a permitted pitch range concurrently with at least a part of the controlling (1550) of the reducing of the groundspeed, wherein the permitted pitch range is dynamically determined in response to the measured airspeed of the air vehicle (100).

31. The method according to claim 30, wherein the keeping of the pitch within the permitted pitch range prevents stalling of the air vehicle.

32. The method according to claim 19, wherein the controlling (1540) in the second part of the descent is preceded by determining a permitted air vehicle descending angle for at least a part of the descending course based on atmospheric conditions, wherein the controlling (1510) of the descending course during at least a part of the first part of the descent is based on the permitted air vehicle descending angle.

33. The method according to claim 19, further comprising controlling a substantially vertical descent of the air vehicle, after the reducing of the groundspeed of the air vehicle (100) substantially to hover, until a fulfillment of at least one ground detection condition.

34. The method according to claim 33, comprising controlling (1620) a reduction of an altitude of the air vehicle (100) during at least a part of the vertical descent, wherein the controlling (1620) of the reduction of the altitude comprises controlling modification of thrust power of the at least one tiltable propulsion unit for minimizing a deviation of the monitored altitude of the air vehicle (100) from a monotonously decreasing set altitude that decreases below a local ground level more than five times a height of the air vehicle.

35. The method according to claim 34, comprising initiating the controlling of the substantially vertical descent of the air vehicle (100) if predetermined time elapsed from the tilting of the at least one tiltable propulsion unit, regardless of sensors data.

36. The method according to claim 19, wherein at least the controlling (1510) of the descending course comprises controlling an operation of at least one aerodynamic part of the air vehicle (100) selected from a group consisting of an aileron, an elevator, a rudder, a ruddervator, a flaperon, elevons, and a wing flap.

37. The method according to claim 19, further comprises reducing rotation speed of at least one rotating component of one or more of the at least one tiltable propulsion units between the first and the second parts of the descent, for reducing angular momentum on the at least one tiltable propulsion unit.

38. The method according to claim 19, wherein the air vehicle comprises at least one non-tiltable propulsion unit, the method comprising: during at least part of the second part of the descent, controlling operating of at least one non-tiltable propulsion unit to provide thrust in the general vertical thrust vector direction.

39. A program storage device readable by machine, tangibly embodying a computer readable code portion executable by the machine for controlling a deceleration process of an air vehicle which comprises at least one tiltable propulsion unit, each of the at least one tiltable propulsion units is tiltable to provide a thrust whose direction is variable at least between a general vertical thrust vector direction and a general longitudinal thrust vector direction with respect to the air vehicle; the air vehicle further comprises a wing configured to provide lift to the air vehicle; the wing being in a fixed position during flight of the air vehicle, the computer readable code portion comprising instructions for:
   during a descent of the air vehicle, controlling a descending course of the air vehicle based on at least monitored airspeed and monitored altitude of the air vehicle, said controlling comprising carrying out in the following order:
   in a first part of the descent, controlling an operation of the at least one tiltable propulsion unit to provide thrust in the general longitudinal thrust vector direction for propelling the air vehicle; and
   following a tilting of the at least one tiltable propulsion unit, controlling in a second part of the descent an operation of the at least one tiltable propulsion unit to provide thrust in the general vertical thrust vector direction for providing lift to the air vehicle; and
   controlling a reducing of a groundspeed of the air vehicle substantially to a hover, while the at least one tiltable propulsion unit provides thrust in the general vertical thrust vector direction, at least by:
   controlling thrust power of the at least one tiltable propulsion unit for reducing a difference between measured groundspeed of the air vehicle and set groundspeed, while restricting reduction of the thrust power based on a lower threshold that is determined in response to a measured airspeed of the air vehicle; and
   controlling the reducing of the groundspeed of the air vehicle during a substantially horizontal flight of the air vehicle, and controlling, during at least the second part of the descent, reduction of the groundspeed below a maximum permitted threshold speed before an end of the descent and before a beginning of the substantially horizontal flight of the air vehicle.

40. A control system (1200) configured to control a deceleration process of an air vehicle (100) which comprises at least one tiltable propulsion unit (420), each of the at least one tiltable propulsion units is tiltable to provide a thrust whose direction is variable at least between a general vertical thrust vector direction and a general longitudinal thrust vector direction with respect to the air vehicle; the air vehicle further comprises a wing (320) configured to provide lift to the air vehicle; the wing being in a fixed position during flight of the air vehicle the control system comprising:
   at least one input for receiving information indicative of monitored airspeed of the air vehicle and of monitored altitude of the air vehicle; and
   a control unit (1220), configured to issue controlling commands to controllers (1410, 1420, 1420, 1440, 1450) of aerodynamic systems (420, 345) of the air vehicle, the aerodynamic systems comprising the at least one tiltable propulsion unit; wherein the control unit is configured issue the controlling commands for:
   c. controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and
   d. controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold (1720) that is determined in response to a measured airspeed of the air vehicle;
   wherein the control unit comprises a pitch control module (1224), configured to keep a pitch of the air vehicle within a permitted pitch range when the control unit controls the reducing of the groundspeed, wherein the permitted pitch range is dynamically determined in response to the measured airspeed of the air vehicle.

41. The system according to claim 40, wherein the air vehicle includes a wing (320), wherein the control unit is configured to balance between contradictory aerodynamic effects resulting from the wing and from the at least one tiltable propulsion unit.

42. A method (1500) for controlling a deceleration process of an air vehicle (100) which comprises at least one tiltable propulsion unit (420), each of the at least one tiltable propulsion unit is tiltable to provide a thrust whose direction is variable at least between a general vertical thrust vector direction and a general longitudinal thrust vector direction with respect to the air vehicle (100); the air vehicle further comprises a wing (320) configured to provide lift to the air vehicle; the wing being in a fixed position during flight of the air vehicle, the method comprising:
   during a descent of the air vehicle (100), controlling (1510) a descending course of the air vehicle (100)

based on at least monitored airspeed and monitored altitude of the air vehicle (100), said controlling comprising carrying out:

in a first part of the descent, controlling (1520) an operation of the at least one tiltable propulsion unit to provide thrust in the general longitudinal thrust vector direction for propelling the air vehicle (100); and following a tilting of the at least one tiltable propulsion unit, controlling (1540) in a second part of the descent an operation of the at least one tiltable propulsion unit to provide thrust in the general vertical thrust vector direction for providing lift to the air vehicle (100); and controlling (1550) a reducing of a groundspeed of the air vehicle (100) substantially to a hover, while the at least one tiltable propulsion unit provides thrust in the general vertical thrust vector direction, at least by:

controlling (1560) thrust power of the at least one tiltable propulsion unit for reducing a difference between measured groundspeed of the air vehicle (100) and set groundspeed, while restricting reduction of the thrust power based on a lower threshold (1720) that is determined in response to a measured airspeed of the air vehicle;

balancing, during the deceleration process, between aerodynamic effects resulting from the wing and from the at least one tiltable propulsion unit; and minimizing a vertical deviation of the air vehicle from a set altitude when controlling the reducing of the groundspeed, and restricting the minimizing at least based on the restricting of the reduction of the thrust power based on the lower threshold.

43. A control system (1200) configured to control a deceleration process of an air vehicle (100) which comprises at least one tiltable propulsion unit (420), each of the at least one tiltable propulsion units is tiltable to provide a thrust whose direction is variable at least between a general vertical thrust vector direction and a general longitudinal thrust vector direction with respect to the air vehicle; the air vehicle further comprises a wing (320) configured to provide lift to the air vehicle; the wing being in a fixed position during flight of the air vehicle the control system comprising:

at least one input for receiving information indicative of monitored airspeed of the air vehicle and of monitored altitude of the air vehicle; and a control unit (1220), configured to issue controlling commands to controllers (1410, 1420, 1420, 1440, 1450) of aerodynamic systems (420, 345) of the air vehicle, the aerodynamic systems comprising the at least one tiltable propulsion unit; wherein the control unit is configured issue the controlling commands for:

a. controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and b. controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold (1720) that is determined in response to a measured airspeed of the air vehicle, wherein the control unit comprises an altitude control module (1221) configured to minimize a vertical deviation of the air vehicle from a set altitude when the control unit controls the reducing of the groundspeed, and to restrict the minimizing at least based on the restricting of the reduction of the thrust power based on the lower threshold.

44. A control system (1200) configured to control a deceleration process of an air vehicle (100) which comprises at least one tiltable propulsion unit (420), each of the at least one tiltable propulsion units is tiltable to provide a thrust whose direction is variable at least between a general vertical thrust vector direction and a general longitudinal thrust vector direction with respect to the air vehicle; the air vehicle further comprises a wing (320) configured to provide lift to the air vehicle; the wing being in a fixed position during flight of the air vehicle the control system comprising:

at least one input for receiving information indicative of monitored airspeed of the air vehicle and of monitored altitude of the air vehicle; and a control unit (1220), configured to issue controlling commands to controllers (1410, 1420, 1420, 1440, 1450) of aerodynamic systems (420, 345) of the air vehicle, the aerodynamic systems comprising the at least one tiltable propulsion unit; wherein the control unit is configured issue the controlling commands for:

a. controlling, during a descent of the air vehicle, a descending course of the air vehicle based on at least monitored airspeed and monitored altitude of the air vehicle, at least by controlling in a first part of the descent, an operation of the at least one tiltable propulsion unit to provide thrust in the general longitudinal thrust vector direction for propelling the air vehicle; and following a tilting of the at least one tiltable propulsion unit, controlling in a second part of the descent an operation of the at least one tiltable propulsion unit to provide thrust in the general vertical thrust vector direction for providing lift to the air vehicle; and b. controlling a reducing of a groundspeed of the air vehicle substantially to a hover, while the at least one tiltable propulsion unit provides thrust in the general vertical thrust vector direction, at least by controlling thrust power of the at least one tiltable propulsion unit for reducing a difference between measured groundspeed of the air vehicle and set groundspeed, while restricting reduction of the thrust power based on a lower threshold (1720) that is determined in response to a measured airspeed of the air vehicle, wherein the control unit further includes a monitor, configured to repeatedly check, starting at the first part of the descent and at least until a first occurrence of an event selected from (a) receiving a negative result and (b) reduction of the groundspeed to substantially hovering, whether flight parameters are within an envelope permitting deceleration to hover at a predetermined hover destination position, and wherein the control unit is configured to selectively instruct tilting of the at least one tiltable propulsion unit to provide thrust in the general longitudinal thrust vector direction if a result of the checking was negative, and to further control a directing of the air vehicle to a position and a state in which the flight parameters are within the envelope.

* * * * *